US010274586B2

(12) United States Patent
Takada et al.

(10) Patent No.: US 10,274,586 B2
(45) Date of Patent: Apr. 30, 2019

(54) VEHICLE DETECTION DEVICE, VEHICLE GATE SYSTEM, AND METHOD OF CONTROLLING VEHICLE DETECTION DEVICE

(71) Applicant: OPTEX CO., LTD., Shiga (JP)

(72) Inventors: Yasuhiro Takada, Shiga (JP); Naoki Kageyama, Shiga (JP); Mitsugu Mihara, Shiga (JP)

(73) Assignee: OPTEX CO., LTD., Shiga (JP)

(*) Notice: Subject to any disclaimer, the term of this patent is extended or adjusted under 35 U.S.C. 154(b) by 531 days.

(21) Appl. No.: 15/011,763

(22) Filed: Feb. 1, 2016

(65) Prior Publication Data

US 2016/0223650 A1 Aug. 4, 2016

(30) Foreign Application Priority Data

Feb. 3, 2015 (JP) ................................ 2015-019729

(51) Int. Cl.
*G01S 7/41* (2006.01)
*E05F 15/73* (2015.01)
*G01S 13/34* (2006.01)
*G01S 13/56* (2006.01)
*G01S 13/58* (2006.01)
(Continued)

(52) U.S. Cl.
CPC .............. *G01S 7/411* (2013.01); *E05F 15/73* (2015.01); *G01S 13/34* (2013.01); *G01S 13/56* (2013.01); *G01S 13/583* (2013.01); *G01S 13/862* (2013.01); *G01S 13/865* (2013.01); *G01S 13/867* (2013.01); *G01S 13/91* (2013.01)

(58) Field of Classification Search
CPC .......... C07C 45/62; E05F 15/73; G01S 13/34; G01S 13/56; G01S 13/583; G01S 13/862; G01S 13/865; G01S 13/867; G01S 13/91; G01S 7/411
USPC ........................................................... 342/69
See application file for complete search history.

(56) References Cited

U.S. PATENT DOCUMENTS

2004/0140927 A1* 7/2004 Meinecke .............. G01S 7/411 342/70
2004/0246167 A1 12/2004 Kumon et al.
2005/0007124 A1 1/2005 Tsuji
(Continued)

FOREIGN PATENT DOCUMENTS

DE 102012008608 B3 4/2013
EP 1923717 A1 5/2008
(Continued)

OTHER PUBLICATIONS

Extended European Search Report dated Jun. 27, 2016.
(Continued)

*Primary Examiner* — Timothy X Pham
(74) *Attorney, Agent, or Firm* — Harness, Dickey & Pierce, P.L.C.

(57) ABSTRACT

A vehicle detection device includes: a first signal obtaining section which obtains a first signal corresponding to a distance to a subject object; a second signal obtaining section which obtains a second signal corresponding to a solid angle formed by the subject object; and a vehicle determining section which determines, based on the first and second signals, that the subject object is a vehicle, in a case where an actual size of the subject object is equal to or greater than a predetermined size.

6 Claims, 12 Drawing Sheets

(51) Int. Cl.
*G01S 13/86* (2006.01)
*G01S 13/91* (2006.01)

(56) References Cited

U.S. PATENT DOCUMENTS

| | | | | |
|---|---|---|---|---|
| 2005/0242986 | A1 | 11/2005 | Hanawa et al. | |
| 2006/0012511 | A1 | 1/2006 | Dooi et al. | |
| 2007/0132611 | A1 | 6/2007 | Ponert | |
| 2008/0111733 | A1* | 5/2008 | Spyropulos | G01S 7/412 342/189 |
| 2008/0291078 | A1 | 11/2008 | Hilsebecher et al. | |
| 2009/0045999 | A1* | 2/2009 | Samukawa | B60T 7/22 342/70 |
| 2010/0123601 | A1 | 5/2010 | Schmid | |
| 2013/0207834 | A1* | 8/2013 | Mizutani | G01S 7/411 342/70 |
| 2014/0022110 | A1* | 1/2014 | Itohara | G01S 7/295 342/107 |
| 2014/0327567 | A1* | 11/2014 | Kishigami | G01S 13/91 342/146 |

FOREIGN PATENT DOCUMENTS

| | | | |
|---|---|---|---|
| JP | H04105086 | A | 4/1992 |
| JP | H07037176 | A | 2/1995 |
| JP | 11-345390 | | 12/1999 |
| JP | 2002-288697 | A | 10/2002 |
| JP | 2003-121534 | A | 4/2003 |
| JP | 2003-187379 | A | 7/2003 |
| JP | 2003-240848 | A | 8/2003 |
| JP | 2004-191131 | A | 7/2004 |
| JP | 2005-025528 | A | 1/2005 |
| JP | 2005-332052 | A | 12/2005 |
| JP | 2006-029858 | A | 2/2006 |
| JP | 2006-098099 | A | 4/2006 |
| JP | 2006-105865 | A | 4/2006 |
| JP | 2006-317456 | A | 11/2006 |
| JP | 2006-337223 | A | 12/2006 |
| JP | 2007-205018 | A | 8/2007 |
| JP | 2007-288460 | A | 11/2007 |
| JP | 2007-326380 | A | 12/2007 |
| JP | 2008-532000 | A | 8/2008 |
| JP | 2009-103566 | A | 5/2009 |
| JP | 2011-008505 | A | 1/2011 |

OTHER PUBLICATIONS

Japanese Office Action and partial English translation thereof for corresponding Japanese Patent Application No. 2015-019729 dated Oct. 9, 2018.

* cited by examiner

VEHICLE DETECTION DEVICE, VEHICLE GATE SYSTEM, AND METHOD OF CONTROLLING VEHICLE DETECTION DEVICE

This nonprovisional application claims priority under 35 U.S.C. § 119 on Patent Application No. 2015-19729 filed in Japan on Feb. 3, 2015, the entire contents of which are hereby incorporated by reference.

TECHNICAL FIELD

The present invention relates to a vehicle detection device and the like which detects a vehicle.

BACKGROUND ART

At entrances and exits of parking lots, individual parking spaces of parking lots, and the like places, vehicle detection sensors which detect vehicles are commonly installed to manage vehicles going in and out of the parking lots or the individual parking spaces. An example of such vehicle detection sensors is disclosed in, for example, Patent Literature 1.

Patent Literature 1 discloses a locking device, which is installed in a parking space, for locking a parked vehicle. The locking device includes vehicle detection sensor which detects the presence or absence of a vehicle in a parking space based on changes of magnetic flux traveling from a transmission coil to a reception coil. Further, based on an output status of the vehicle detection sensor, locking and unlocking operations of the locking device are controlled.

Patent Literature 2 discloses a vehicle detection device which detects a series of movements of a vehicle from an entry into a coin-operated parking lot to parking in a given space and a series of movements of a vehicle from a start from a parked position to an exit of the parking lot, by comparing signal levels of signals outputted by a sensor, the signals having frequencies that vary with a velocity of the vehicle, with a plurality of reference levels.

CITATION LIST

Patent Literature

[Patent Literature 1]
Japanese Patent Application Publication Tokukai No. 2007-205018 (Publication date: Aug. 16, 2007)
[Patent Literature 2]
Japanese Patent Application Publication Tokukai No. 2006-105865 (Publication date: Apr. 20, 2006)

SUMMARY OF INVENTION

Technical Problem

The configuration in which a vehicle detection sensor uses coils as described above, like the configuration disclosed in Patent Literature 1, is less likely to cause incorrect detection such that a subject object other than a vehicle is detected. This is because such a vehicle detection sensor detects metallic objects but does not detect non-metallic objects.

However, in the event of an impact on the locking device (e.g. a collision of a vehicle with the locking device), wires constituting the coils can break. Further, since the vehicle detection sensor detects metallic objects, the vehicle detection sensor can unfortunately detect any metallic objects other than vehicles. Thus, in a case where the locking device is installed in a structure composed of metallic objects (e.g. a multi-story parking garage in which a skeleton framework thereof is composed of metallic objects), the locking device may detect objects other than vehicles.

Furthermore, in a case where the coils (loop coils) are mounted at, for example, an entrance of a parking lot, or the like place, the coils are usually buried into the ground. In this case, the coils are less susceptible to wind and snow damage. Therefore, in the case where the coils are buried into the ground, the vehicle detection sensor is less likely to cause incorrect detection and is excellent in environmental resistance.

However, the above arrangement requires a construction for the burial of the coils into the ground. Typically, after the surface of the ground is coated with asphalt, the asphalt is partially removed at a mounting location of the coils, and the coils are then buried at that location. Therefore, the mounting of coils is costly and takes effort.

Besides, in a case where the buried coils need repair due to a breakdown, the construction is required again. Particularly, in a case where the coils are buried under bricks or the like, it takes more effort to pull the coils out of the ground than in a case where the coils are buried under asphalt. That is, the degree of complexity of the construction increases depending on what material is used at the mounting location.

As described above, the configuration using coils can give rise to various problems.

Further, in the technique disclosed in Patent Literature 2, output of microwaves is not intended to distinguish between a vehicle and a human present in a parking space. Consequently, in a case where a human is present in a parking space, the technique disclosed in Patent Literature 2 can cause incorrect detection such that a human is detected as being a vehicle, and thus cause erroneous determination such that a movement of a human is determined as a movement of a vehicle.

The present invention has been attained in view of the above problems, and it is an object of the present invention to provide a vehicle detection device and the like, in an arrangement such that detection of a vehicle is performed without using a coil, being capable of detecting a vehicle while positively distinguishing the vehicle from a subject object other than a vehicle.

Solution to Problem

In order to solve the above problem, a vehicle detection device in accordance with the present invention is a vehicle detection device which detects a vehicle, including: a first signal obtaining section which obtains a first signal corresponding to a distance to a subject object; a second signal obtaining section which obtains a second signal corresponding to a solid angle formed by the subject object; and a vehicle determining section which determines, based on the first and second signals, that the subject object is a vehicle, in a case where an actual size of the subject object is equal to or greater than a predetermined size.

Further, a method of controlling a vehicle detection device in accordance with the present invention is a method of controlling a vehicle detection device which detects a vehicle, including: a first signal obtaining step of obtaining a first signal corresponding to a distance to a subject object; a second signal obtaining step of obtaining a second signal corresponding to a solid angle formed by the subject object; and a vehicle determining step of determining, based on the first and second signals, that the subject object is a vehicle, in a case where an actual size of the subject object is equal to or greater than a predetermined size.

Advantageous Effects of Invention

According to a vehicle detection device in accordance with the present invention and a method of controlling the vehicle detection device, it is possible to, in an arrangement such that detection of a vehicle is performed without using a coil, detect a vehicle while positively distinguishing the vehicle from a subject object other than a vehicle.

DESCRIPTION OF EMBODIMENTS

Embodiment 1

With reference to FIGS. 1 to 7, the following will describe a vehicle detection device 2 in accordance with an embodiment of the present invention and.

<Configuration of Vehicle Gate System 1>

Figure 2:
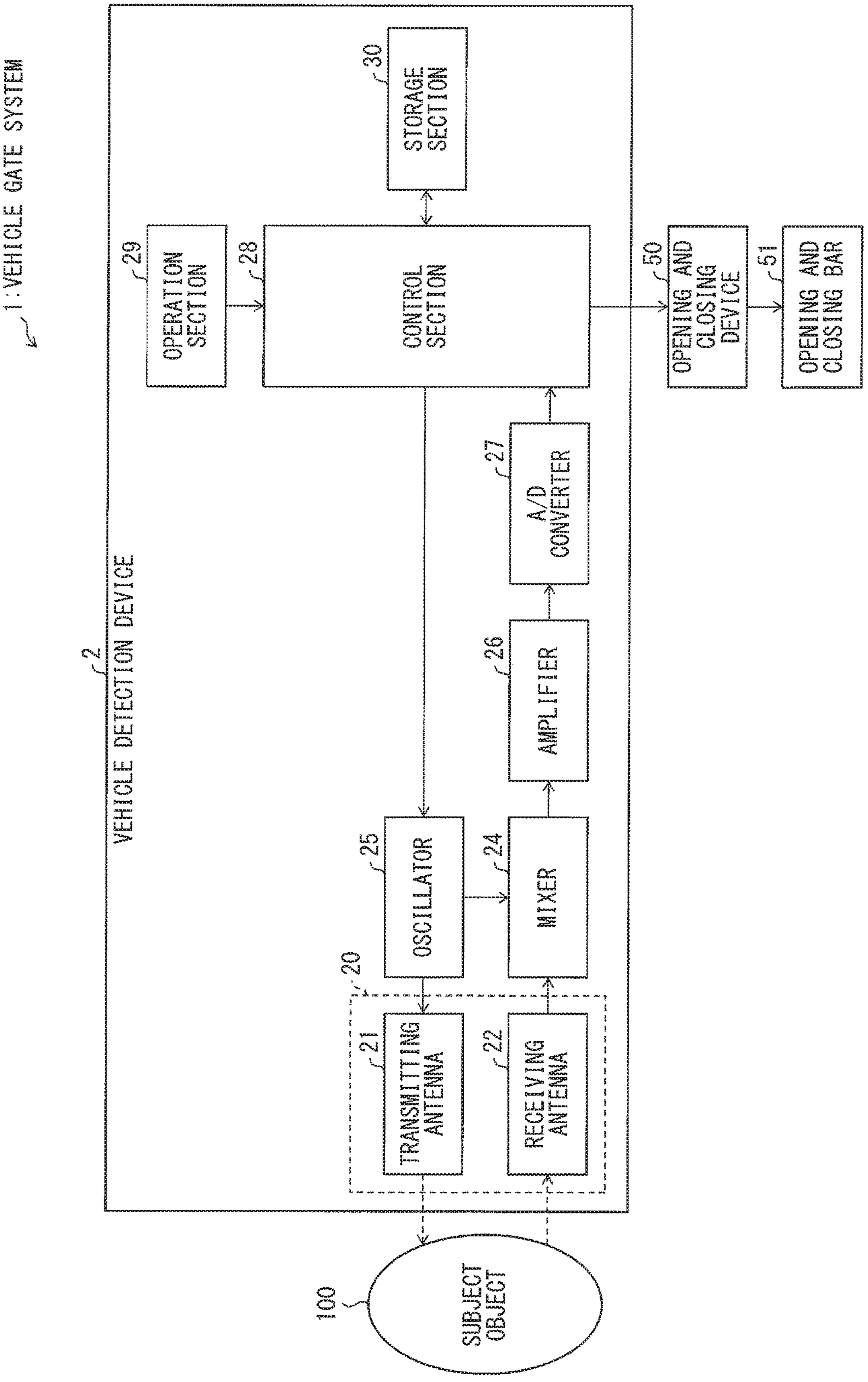
FIG. 2 is a block diagram schematically illustrating an example configuration of a vehicle gate system including the vehicle detection device.

First, the following will describe an example configuration of a vehicle gate system 1 with reference to FIG. 2. FIG. 2 is a block diagram schematically illustrating an example configuration of the vehicle gate system 1.

As illustrated in FIG. 2, the vehicle gate system 1 mainly includes the vehicle detection device 2, an opening and closing device 50, and an opening and closing bar 51. The vehicle gate system 1 controls opening and closing of the opening and closing bar 51 in response to comings and goings of vehicles. The vehicle gate system 1 is installed at, for example, a gate of a parking lot or a gate of a garage.

The vehicle detection device 2 is a vehicle detection sensor which uses microwaves (MW) to detect a vehicle by determining whether a subject object 100 is a vehicle or not. The vehicle detection device 2 is also capable of detecting a subject object other than a vehicle according to a mode being set. Details of the vehicle detection device 2 will be described later.

The opening and closing device 50 performs switching, based on a result of detection made by the vehicle detection device 2, between a state to let a vehicle stop and a state to let a vehicle pass. That is, the opening and closing device 50 controls opening and closing operations of the opening and closing bar 51 on the basis of the detection result. For example, the opening and closing device 50 opens the opening and closing bar 51 in a case where any vehicle has been detected in a predetermined range (in this case, a region outside the opening and closing bar 51), and then closes the opening and closing bar 51 after an elapse of a predetermined period of time since no vehicle has been detected in the predetermined range. Further, the opening and closing device 50 opens the opening and closing bar 51 in a case where any vehicle has been detected in the predetermined range and where the opening and closing device 50 has determined that collection of a parking fee has been completed, and then closes the opening and closing bar 51, as in the above-described case, after an elapse of a predetermined period of time.

The predetermined range falls within at least a detection range (area) where the vehicle detection device 2 can detect the subject object 100, and is a range based on which a determination process is performed of determining whether the subject object 100 is a vehicle or not and whether the subject object 100 or a vehicle has entered the predetermined range. In other words, the predetermined range is a range which is located in the detection range and in which opening and closing operations of the opening and closing bar 51 are controlled. Alternatively, the predetermined range may be identical to the detection range.

The opening and closing bar 51 is the one for controlling vehicles to go in and out under control of the opening and closing device 50. Closing of the opening and closing bar 51 physically blocks vehicles from going in and out. The opening and closing bar 51 can be replaced by anything that can have such a blocking function. For example, the opening and closing bar 51 may be replaced by a door.

Although the above description assumes the arrangement in which the vehicle detection device 2 is provided in the vehicle gate system 1, the present invention is not limited to this arrangement. Alternatively, the vehicle detection device 2 may be provided in, for example, a vehicle counting system including a vehicle counting device which counts vehicles. In such an arrangement, the vehicle counting device is able to communicate with the vehicle detection device 2 and counts a vehicle in a case where the vehicle detection device 2 has detected a vehicle. This makes it possible to accurately manage the number of vehicles which are present in, for example, a predetermined area within a parking lot. Further, it is possible to accurately determine whether the predetermined area has an available parking space (a vacant parking space).

Further alternatively, the vehicle detection device 2 may be provided in a parking management system which manages vehicles going in and out of individual parking spaces. In such an arrangement, the vehicle detection device 2 is provided in each of the parking spaces and is intercommunicatively connected to a drive section which controls driving of a locking section (see Patent Literature 1) provided in each of the parking spaces. The drive section drives the locking section after an elapse of a certain period of time since a vehicle has been detected by the vehicle detection device 2, so that the locking section prevents the vehicle from going out of a corresponding one of the parking spaces. This makes it possible to prevent the locking section from being driven in response to the presence of a subject object other than a vehicle.

<Specific Configuration of the Vehicle Detection Device 2>

Next, the following will describe an example configuration of the vehicle detection device 2 with reference to FIGS. 1 to 5.

(Outer Appearance of the Vehicle Detection Device 2)

Figure 3:
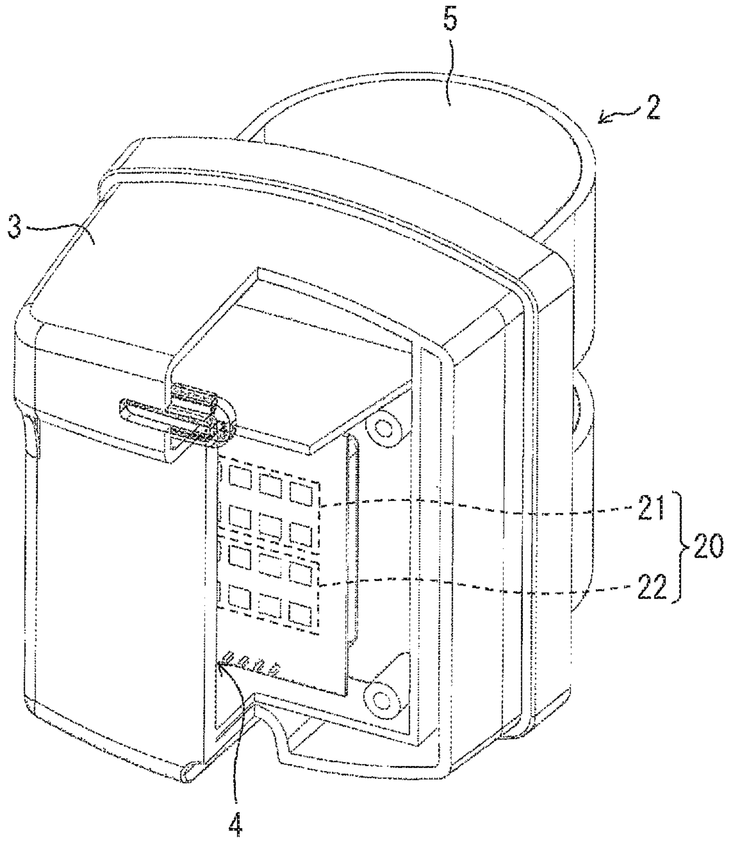
FIG. 3 is an oblique view illustrating an example outer appearance of the vehicle detection device.

First, an outer appearance of the vehicle detection device 2 will be described with reference to FIG. 3. FIG. 3 is a view illustrating an example outer appearance of the vehicle detection device 2.

As illustrated in FIG. 3, the vehicle detection device 2 mainly includes a main body casing 3, a radome 4, a support attaching section 5, and an antenna 20.

The main body casing 3 accommodates various kinds of components included in the vehicle detection device 2 and defines an outside shape of the vehicle detection device 2. The main body casing 3 is made of, for example, a resin.

The radome 4, which is provided at a position opposite to the antenna 20, protects the antenna 20 against climatic conditions such as wind, rain, snow, sand, ice, and sunlight. The radome 4 is made of a material having a high microwave transmission rate (e.g. a resin or a glass fiber). A material of the radome 4, a thickness of the radome 4, a position of the radome 4 in relation to the antenna 20, and the like conditions are rigorously specified so that a microwave transmitted from the antenna 20 is transmitted to the outside of the vehicle detection device 2, and a reflection wave reflected back by the subject object 100 is received by the antenna 20.

The support attaching section 5 is a component for attaching the vehicle detection device 2 to a pole which is installed at a gate of a parking lot. The support attaching section 5 may be shaped to fit to, for example, a plate-like support such as a fence or a wall of the opening and closing device 50, instead of the pole, so that the vehicle detection device 2 can be attached to the support. The vehicle detection device 2 is attached to the pole so that the antenna 20 points in a direction in which a vehicle going to pass through a gate of a parking lot is detectable.

The antenna 20 transmits and receives microwaves and includes a transmitting antenna 21 and a receiving antenna 22. Details of the antenna 20 will be described later.

(Internal Configuration of the Vehicle Detection Device 2)

As illustrated in FIG. 2, the vehicle detection device 2 mainly includes the antenna 20 (the transmitting antenna 21, the receiving antenna 22), a mixer 24 (signal processing section), an oscillator 25, an amplifier 26, an analog/digital (A/D) converter 27, a control section 28, an operation section 29, and a storage section 30.

The antenna 20 includes the transmitting antenna 21 which transmits microwaves and the receiving antenna 22 which receives microwaves. The transmitting antenna 21 transmits, in the form of microwaves (transmission waves), (i) a frequency modulated continuous wave (FMCW) signal or a two-frequency continuous wave (CW) signal and (ii) a Doppler signal. The receiving antenna 22 receives microwaves (reflection waves) which originate from the microwaves having been transmitted from the transmitting antenna 21 and reflected back by the subject object 100. The vehicle detection device 2 analyzes transmitted and received microwaves to determine whether the subject object 100 is a vehicle.

The Doppler signal transmitted from the transmitting antenna 21 is usually identical to a signal to be transmitted for measuring a velocity of the subject object 100 or a travel direction of the subject object 100. Thus, by transmitting the Doppler signal, the vehicle detection device 2 can measure modulation, caused by the Doppler effect, of a frequency of a reflection wave having been received from the subject object 100 and resulting from reflection of the Doppler signal. The Doppler signal can be, for example, an unmodulated sinusoidal wave signal or a periodic continuous wave.

The mixer 24 processes, out of the microwaves having been received by the receiving antenna 22, a FMCW signal-based or two-frequency CW signal-based microwave received by the receiving antenna 22 into a FMCW signal-based or two-frequency CW signal-based beat signal, and processes a Doppler signal-based microwave received by the receiving antenna 22 into a Doppler signal-based beat signal. Specifically, whichever reflection waves received from the receiving antenna 22 are based on (i) the FMCW signal or the two-frequency CW signal or (ii) the Doppler signal, the mixer 24 mixes (a) the reflection waves and (b) transmission waves, from which the reflection waves are originated, transmitted from the transmitting antenna 21 into respective beat signals, and then transmits the beat signals to the amplifier 26.

The oscillator 25, in response to an instruction from the control section 28, generates (i) a FMCW signal or a two-frequency CW signal and (ii) a Doppler signal while switching between (i) the FMCW signal or the two-frequency CW signal and (ii) the Doppler signal in a time-division manner. The oscillator 25 also transmits the signals thus generated to the transmitting antenna 21 in an alternating manner. This configuration allows the transmitting antenna 21 to transmit two types of signals, which are (i) the FMCW signal or the two-frequency CW signal and (ii) the Doppler signal, in a time-division manner and allows the receiving antenna 22 to receive reflection waves corresponding to the two types of signals in a time-division manner. This allows the antenna 20 to transmit and receive the two types of signals, and thus allows the control section 28, which will be described later, to detect a vehicle on the basis of these two types of signals.

Note that an oscillation interval (transmission interval) between the two types of signals is set to an interval during which the control section 28 is able to calculate a distance to the subject object 100 and to calculate a magnitude of an amplitude of the Doppler signal-based second signal (described later).

Further, in the above configuration, the oscillator 25 generates the two types of signals in a time-division manner, and the transmitting antenna 21 transmits these two types of signals in a time-division manner. However, this is not intended to limit the present invention. An alternative configuration may be employed in which individual oscillators are provided to generate the respective two types of signals, two transmitting antennas are provided to transmit the respective two types of signals, and two receiving antennas are provided to receive respective signals originating from the two types of signals. Such a configuration eliminates the need for treating the two types of signals in a time-division manner, but increases a component count. In terms of decreasing in component count and reducing size of the vehicle detection device 2, the configuration in which time-division processing is carried out as described above with the antenna 20 constituted by a single unit is preferably employed.

The amplifier 26 amplifies beat signals received from the mixer 24. The A/D converter 27 converts beat signals (analog signals) amplified by the amplifier 26 into digital signals that can be processed by the control section 28.

The control section 28 controls components constituting the vehicle detection device 2 by executing, for example, a control program. The control section 28 (i) reads a program from the storage section 30 into a temporary memory section (not shown in the drawings) including, for example, a random access memory (RAM) and (ii) executes that program to perform various processes including signal analysis on beat signals and a vehicle determination process.

The operation section 29 accepts an instruction from a user and is constituted by, for example, a button or the like. The instruction from a user is, for example, a switching instruction given to switch between a vehicle detection mode in which the vehicle detection device 2 detects a vehicle accurately and an every object detection mode in which the vehicle detection device 2 detects every object regardless of whether the object is a vehicle or not. In other words, the vehicle detection mode is a mode in which a human cancellation function of cancelling detection of a human is enabled, and the every object detection mode is a mode in which the human cancellation function is disabled. Note that the operation section 29 may be constituted as an external device to be intercommunicatively connected to the vehicle detection device 2 via, for example, a wireless medium.

The storage section 30 stores, for example, various control programs to be executed by the control section 28. The storage section 30 is constituted by, for example, a non-volatile storage device such as a hard disk or a flash memory.

(Specific Configuration of the Control Section 28)

Figure 1:
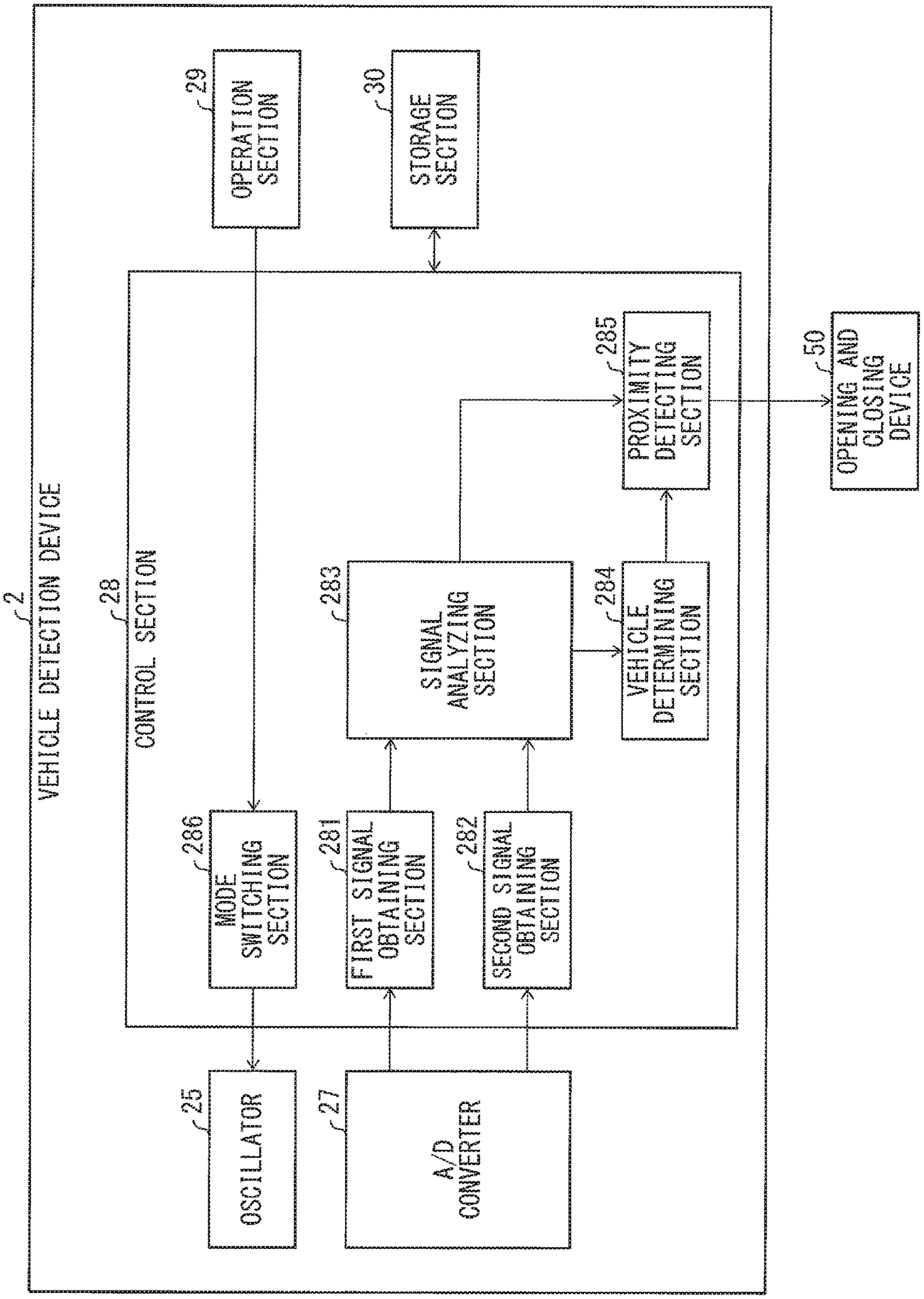
FIG. 1 is a block diagram schematically illustrating an example configuration of a vehicle detection device in accordance with Embodiment 1 of the present invention.
Figure 4:
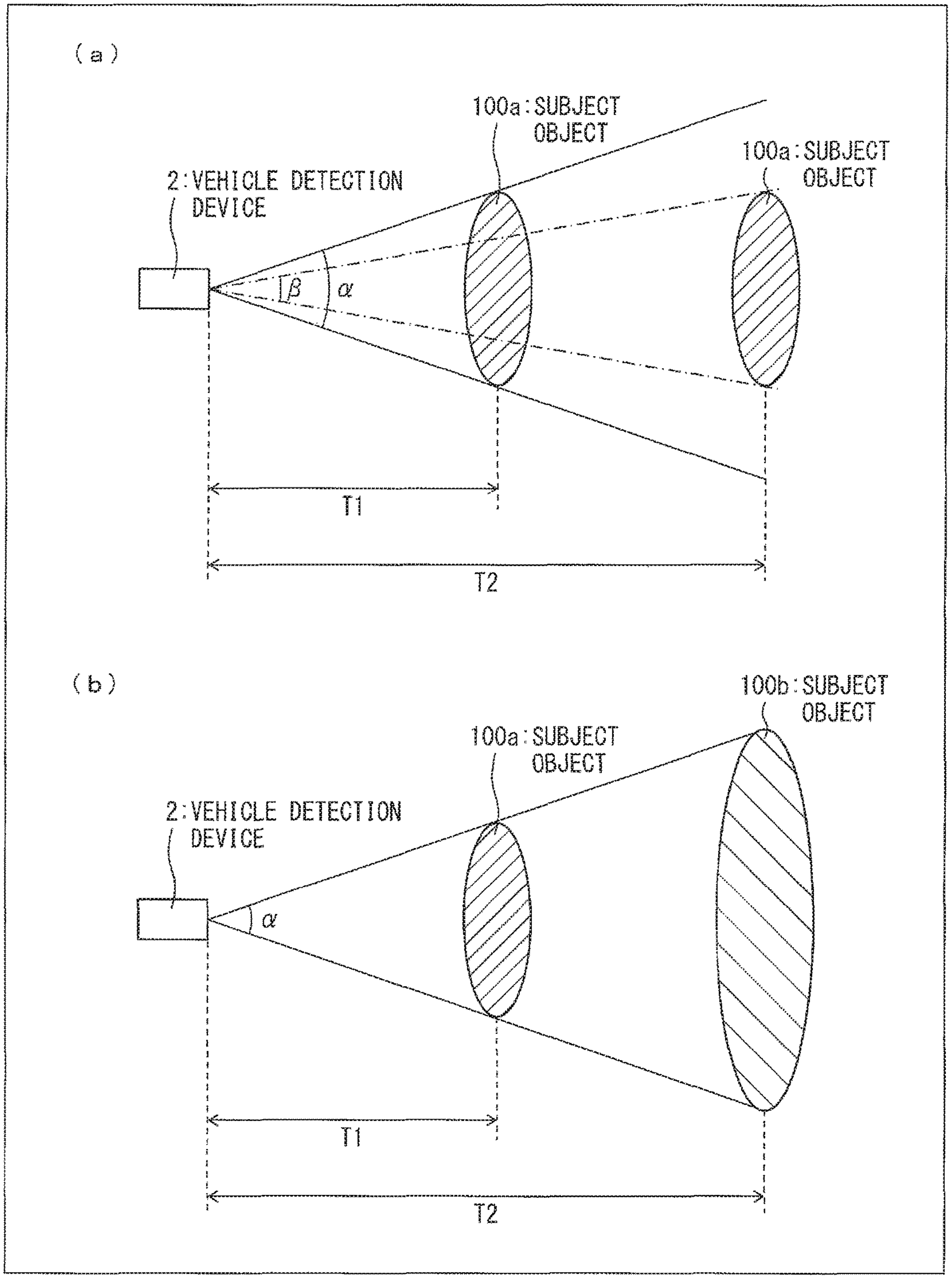
FIG. 4 is an explanatory view illustrating solid angles formed by subject objects, wherein (a) of FIG. 4 is an explanatory view illustrating solid angles formed by two subject objects which are identical in size to each other, and (b) of FIG. 4 is an explanatory view illustrating solid angles formed by two subject objects which are different in size from each other.
Figure 5:
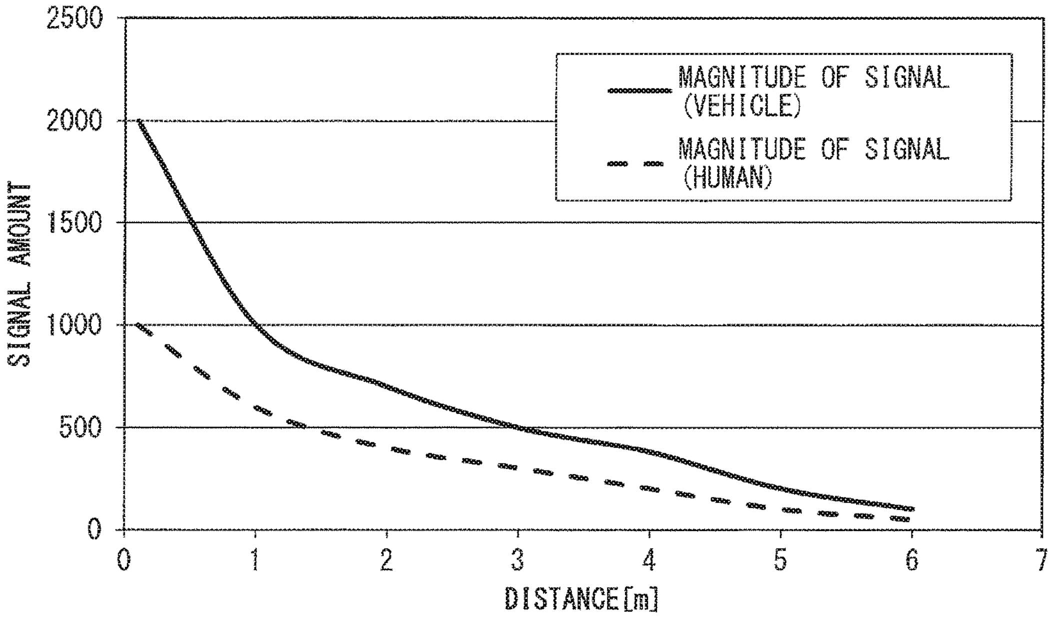
FIG. 5 is a view illustrating an example established data used in the vehicle detection device.

Next, the following will describe an example configuration of the vehicle detection device 2 with reference to FIGS. 1, 2, 4, and 5. FIG. 1 is a block diagram schematically illustrating an example configuration of the vehicle detection device 2 in accordance with the present embodiment. FIG. 4 is an explanatory view illustrating a solid angle formed by a subject object. FIG. 5 is a view illustrating an example established data. Note that FIG. 1 shows only specific components that are necessary for the sake of explanation, out of the components illustrated in FIG. 2.

As illustrated in FIG. 1, the control section 28 mainly includes a first signal obtaining section 281, a second signal obtaining section 282, a signal analyzing section 283, a vehicle determining section 284, a proximity detecting section 285, and a mode switching section 286 (switching section).

The first signal obtaining section 281 obtains, from the A/D converter 27, a first signal corresponding to a distance to the subject object 100. The first signal is a signal for measuring a distance from the vehicle detection device 2 (more specifically, from the antenna 20) to the subject object 100, and the first signal is the FMCW signal-based or two-frequency CW signal-based beat signal generated by the mixer 24. The first signal obtaining section 281 transmits, to the signal analyzing section 283, the obtained first signal to be used for distance measurement.

The second signal obtaining section 282 obtains a second signal corresponding to a solid angle formed by the subject object 100. The second signal is a signal for measuring an apparent size of the subject object 100 which apparent size is equivalent to the magnitude of the solid angle, and the second signal is the Doppler signal-based beat signal generated by the mixer 24. The intensity (magnitude of amplitude) of the Doppler signal-based beat signal increases with increasing proximity of one subject object 100 to the vehicle detection device 2. As described later with reference to FIG. 4, the magnitude of the solid angle varies with variation of the apparent size of the subject object 100. Thus, by measuring the apparent size of the subject object 100 by using a Doppler signal, it is possible to measure the magnitude of the solid angle. The second signal obtaining section 282 transmits, to the signal analyzing section 283, the obtained second signal to be used for measurement of the apparent size of the subject object 100.

The signal analyzing section 283 performs analysis on the first signal having been received from the first signal obtaining section 281 and analysis on the second signal having been received from the second signal obtaining section 282. Specifically, the signal analyzing section 283 performs, for example, fast Fourier transform (FFT) processing on the first signal to calculate a distance to the subject object 100. Further, the signal analyzing section 283 calculates a magnitude of an amplitude of a waveform of the second signal. The signal analyzing section 283 transmits, to the vehicle determining section 284, (a) distance data indicating the distance thus calculated and (b) amplitude data indicating the magnitude thus calculated of the amplitude of the second signal. Further, the distance data is also transmitted to the proximity detecting section 285. Alternatively, the signal analyzing section 283 may perform, for example, the above processing on the second signal to calculate the velocity of the subject object 100 or the travel direction of the subject object 100.

The vehicle determining section 284 determines based on the first signal and the second signal that the subject object 100 is a vehicle, in a case where an actual size of the subject object 100 is equal to or greater than a predetermined size. Specifically, the vehicle determining section 284 compares the received distance data and amplitude data with established data stored in the storage section 30, to determine whether the subject object 100 is a vehicle or not. The vehicle determining section 284 transmits a result of the determination to the proximity detecting section 285.

The proximity detecting section 285 detects, based on the first signal and the result of the determination made by the vehicle determining section 284, that a vehicle has entered the predetermined range (that is, a vehicle is present in the predetermined range). In a case where the proximity detecting section 285 has received the determination result indicating that the subject object 100 is a vehicle from the vehicle determining section 284, the proximity detecting section 285 refers to the distance data, obtained from the signal analyzing section 283, indicating the distance from the vehicle detection device 2 to the subject object 100, to determine whether the vehicle has entered the predetermined range. Alternatively, the proximity detecting section 285 may receive the determination result which is obtained as a result of reference to the distance data and then determine, based on the determination result, whether the vehicle has entered the predetermined range. Then, the proximity detecting section 285 transmits the determination result to the opening and closing device 50.

The mode switching section 286 performs switching of the proximity detecting section 285 so that the proximity detecting section 285 detects that the subject object 100 has entered the predetermined range, regardless of whether the subject object 100 is a vehicle or not. In accordance with a switching instruction from the operation section 29, the mode switching section 286 switches between the vehicle detection mode and the every object detection mode. In a case where the mode switching section 286 has performed switching to the vehicle detection mode, the mode switching section 286 instructs the oscillator 25 to generate the aforementioned two types of signals in a time-division manner. On the other hand, in a case where the mode switching section 286 has performed switching to the every object detection mode, the mode switching section 286 instructs the oscillator 25 to generate only the FMCW signal or the two-frequency CW signal.

The switching to the every object detection mode realizes switching of the proximity detecting section 285. That is, in a case where switching to the every object detection mode has been performed, the vehicle determining section 284 determines whether the subject object 100 is present ahead of the vehicle detection device 2, based on (a) whether the first signal obtaining section 281 could have obtained the first signal (FMCW signal-based or two-frequency CW signal-based signal) or (b) whether a distance to the subject object 100 could have been calculated. In a case where the first signal obtaining section 281 has obtained the first signal, the vehicle determining section 284 determines that the subject object 100 is present. Then, the vehicle determining section 284 transmits, to the proximity detecting section 285, the determination result indicating that the subject object 100 is present ahead of the vehicle detection device 2, instead of the determination result indicating that the subject object 100 is a vehicle. This allows the proximity detecting section 285 to detect that the subject object 100 has entered the predetermined range.

In an alternative arrangement, in a case where switching to the every object detection mode has been performed, the oscillator 25 may generate the aforementioned two types of signals. In such an arrangement, instead of providing the aforementioned instruction to the oscillator 25, disabling the Doppler signal-based processing is done by disabling any one of the function performed by the second signal obtaining section 282, the second signal analysis function performed by the signal analyzing section 283, and the function performed by the vehicle determining section 284. On the other hand, in a case where switching to the vehicle detection mode has been performed, the vehicle determining section 284 determines, based on the first signal and the second signal, whether the subject object 100 is a vehicle or not, as described earlier.

In a case where the mode is set to the vehicle detection mode, it is possible to determine accurately whether the subject object 100 is a vehicle or not. Therefore, in a case where the subject object 100 is anything other than a vehicle, it is possible to prevent any wrong operation such as inaccurate control of opening and closing operations of the opening and closing bar 51 based on the determination result indicating that the subject object 100 is a vehicle.

Here, during installation or inspection of the vehicle detection device 2, adjustment of the detection range is carried out to install the vehicle detection device 2 at appropriate position and orientation so that the detection range where the subject object 100 is to be detected is formed at an intended location. In a case where only the vehicle detection mode has been prepared, the adjustment of the detection range is limited to an adjustment using a vehicle, and it is impossible to carry out an adjustment using a subject object other than a vehicle (for example, an adjustment using a walking human (walk test)).

In the present embodiment, the every object detection mode is prepared, and switching between the vehicle detection mode and the every object detection mode can be performed by a user operation. Then, in a case where switching to the every object detection mode has been performed by a user operation indicating a user's intention to carry out the above adjustment, the proximity detecting section 285 detects an entry of not only a vehicle but also other subject object (e.g. a human) into the predetermined range. Thus, in order to carry out the above adjustment, a user (e.g. an operator who adjusts the detection range) performs switching to the every object detection mode through the operation section 29. This allows the user to perform the adjustment, for example, by himself or herself, without having to use any vehicle. Therefore, the detection range of the vehicle detection device 2 that detects a vehicle accurately can be adjusted in a simple method at some midpoint of an inspection or the like event.

In a case where the vehicle detection sensor is a vehicle detection sensor using a coil, only a metallic object (an iron plate, an iron hand cart, etc.) is available as an object used for the adjustment. This requires the user to perform the adjustment while holding the metallic object with his/her hand(s). Such a requirement is, however, avoided in the present embodiment.

Further, in a case where the vehicle detection device 2 has not detect the subject object 100 for a certain period of time since switching to the every object detection mode (in a case where no first or second signal has been obtained), the mode switching section 286 may switch from the every object detection mode to the vehicle detection mode (normal mode). The every object detection mode is used for the adjustment of the detection range as described earlier, and the every object detection mode is a mode in which every object including a vehicle is subject to detection. Therefore, in a case where the every object detection mode remains enabled, it is impossible to detect a vehicle accurately. According to the above configuration, even in a case where a user has forgotten to perform switching to the vehicle detection mode, it is possible to prevent the every object detection mode from remaining enabled while the every object detection mode is not switched to the vehicle detection mode.

(Relation Between Solid Angle and Position of Subject Object)

Here, the following will describe the "solid angle formed by the subject object 100" with reference to FIG. 4. The following description with reference to in FIG. 4 assumes that "$\alpha$" and "$\beta$" are solid angles formed by a subject object 100*a* or a subject object 100*b*.

The solid angle formed by the subject object 100 is, for example, a solid angle formed by an outline of the subject object 100 or by a line near an outer edge of the subject object 100 when viewed from the vehicle detection device 2. Thus, the magnitude of the solid angle varies with variation of the apparent size of the subject object 100. That is, with use of the solid angle, it is possible to explain a variation in apparent size of the subject object 100.

The size of the subject object 100 viewed from the vehicle detection device 2 (apparent size of the subject object 100) varies depending upon a distance from the vehicle detection device 2 to the subject object 100. For example, the apparent size of the subject object 100 decreases with increasing distance from the vehicle detection device 2. Therefore, even though subject objects 100 are identical in size to each other, their apparent sizes are different from each other when the subject objects 100 are positioned at different distances from the vehicle detection device 2.

For example, in (a) of FIG. 4, two subject objects 100*a* are identical in size to each other, one of the subject objects 100*a* is positioned at a distance indicated by T1 from the vehicle detection device 2, and the other subject object 100*a* is positioned at a distance indicated by T2 (T2>T1) from the vehicle detection device 2. In such a case, the magnitude of a solid angle α of the subject object 100*a* positioned at the distance T1 is greater than that of a solid angle β of the subject object 100*a* positioned at the distance T2. That is, the apparent size of the subject object 100*a* positioned at the distance T1 is greater than the apparent size of the subject object 100*a* positioned at the distance T2.

Meanwhile, for example, in (b) of FIG. 4, subject objects 100*a* and 100*b* are different in size from each other, and the subject object 100*a* is positioned at a distance indicated by T1 from the vehicle detection device 2, and the subject object 100*b* is positioned at a distance indicated by T2 from the vehicle detection device 2. In (b) of FIG. 4, solid angles of the subject objects 100*a* and 100*b* are each α and equal to each other in magnitude. Thus, even though two subject objects 100 are different in size from each other, the apparent sizes of the subject objects 100 can become equal to each other, depending upon positions of the subject objects 100 in relation to the vehicle detection device 2.

Calculating the magnitude of the amplitude of the aforementioned second signal can determine the apparent size of the subject object 100. However, as illustrated in (b) of FIG. 4, in a case where the subject object 100 positioned far away from the vehicle detection device 2 is a relatively large object (e.g. a vehicle), and the subject object 100 positioned close to the vehicle detection device 2 is a relatively small object (e.g. a human), magnitudes of solid angles (magnitudes of amplitudes of the second signals) of these subject objects 100 can be nearly identical to each other. Therefore, in a case where the size of the subject object 100 has been determined based on the second signal only, a failure to accurately determine whether the subject object 100 is a vehicle or not can occur.

Further, for example, the technique disclosed in Patent Literature 2 uses a Doppler sensor as a sensor to determine whether a coin-operated parking lot has a vacant parking space (i.e. a status on entry and exit of vehicles into and from the coin-operated parking lot), based on a change in magnitude of the amplitude of a frequency signal corresponding to a differential in frequency between transmitted and received microwaves. Therefore, the technique disclosed in Patent Literature 2 can unfortunately perform the determination on whether the coin-operated parking lot has a vacant parking space based on a motion of a subject object other than a vehicle (e.g. a human). That is, the technique disclosed in Patent Literature 2 can lead to incorrect detection of a subject object and erroneous determination on a vacancy status.

On the contrary, in the present embodiment, a distance from the vehicle detection device 2 to the subject object 100 is calculated by analyzing the first signal, as described earlier. In addition, for individual distances to the subject object 100, corresponding thresholds are provided by which to determine whether the magnitude of the amplitude of the second signal is equal to or greater than a predetermined magnitude. Thus, it is determined whether the magnitude of the amplitude of the second signal, which magnitude has been obtained by analyzing the second signal, is equal to or greater than the calculated threshold value corresponding to the distance. In this manner, by analyzing the first signal and the second signal, it is possible to accurately determine whether the subject object 100 is a vehicle.

(Example of the Established Data)

FIG. 5 is a graph showing an example of the established data. The established data are threshold values (criteria for the determination) for the vehicle determining section 284 determining whether the subject object 100 is a vehicle or not. For example, as illustrated in FIG. 5, the established data indicates values of the magnitude (signal amount) of the amplitude of the second signal which values vary with varying distance from the vehicle detection device 2.

In FIG. 5, a vertical axis indicates the magnitude of the amplitude of the second signal, and a horizontal axis indicates a distance from the vehicle detection device 2. A graph indicated by a solid line (first graph) shows the magnitude of the amplitude of the second signal when a vehicle has been detected, and a graph indicated by a dashed line (second graph) shows the magnitude of the amplitude of the second signal when a human has been detected. These graphs are obtained by experiment and show how the magnitude of the amplitude of the second signal varies when a vehicle and a human are present at a plurality of predetermined positions.

The vehicle determining section 284 determines, with respect to a distance indicated by the distance data, whether a value of the magnitude of the amplitude indicated by the amplitude data is (a) any of values plotted on the first graph or any of values close to the values plotted on the first graph or (b) any of values plotted on the second graph or any of values close to the values plotted on the second graph. In the former case, the vehicle determining section 284 determines that the subject object 100 is a vehicle. In the latter case, the vehicle determining section 284 determines that the subject object 100 is a human (not a vehicle). This allows preventing the vehicle determining section 284 to erroneously determine a human as being a vehicle.

The values close to the values plotted on the first graph or on the second graph are acceptable values at which a subject object can be determined as being a vehicle or a human. The criteria for the determination allow room for variations in size between vehicles and humans. Since vehicles and humans are of very different sizes, the vehicle determining section 284 can positively distinguish between vehicles and humans even if the criteria for the determination allow a certain range of room for size variations of vehicles and humans.

Note that the established data are not limited to data of the first and second graphs. Alternatively, the established data may be constituted by, for example, data of the first graph only. In such an arrangement, the vehicle determining section 284 determines that the subject object 100 is a vehicle, only in a case where a value of the magnitude of the amplitude indicated by the amplitude data is any of the values plotted on the first graph or any of values close to the values plotted on the first graph. Further alternatively, the established data may be constituted by data of the second graph only. In such an arrangement, the vehicle determining section 284 determines that the subject object 100 is a vehicle, only in a case where a value of the magnitude of the amplitude indicated by the amplitude data is (a) neither any of the values plotted on the second graph nor any of values close to the values plotted on the second graph or is (b) greater than a maximum value of the values close to the values plotted on the second graph. The former arrangement allows more accurate determination because the latter arrangement can cause the vehicle determining section 284 to erroneously determine a subject object other than a vehicle as being a vehicle.

<Processes Performed by the Vehicle Detection Device 2>

Figure 6:
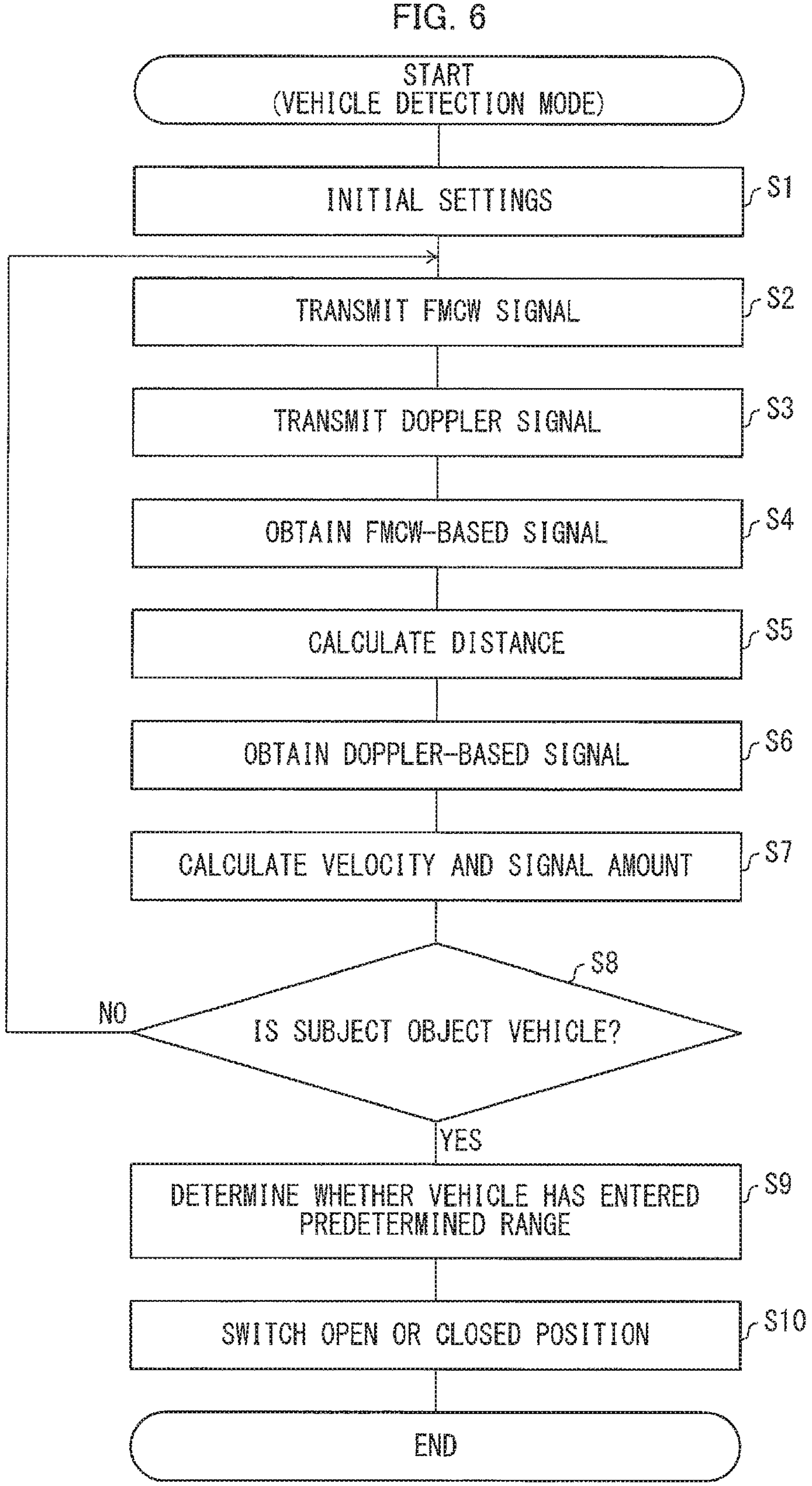
FIG. 6 is a flowchart showing example processes performed by the vehicle detection device in the vehicle detection mode.
Figure 7:
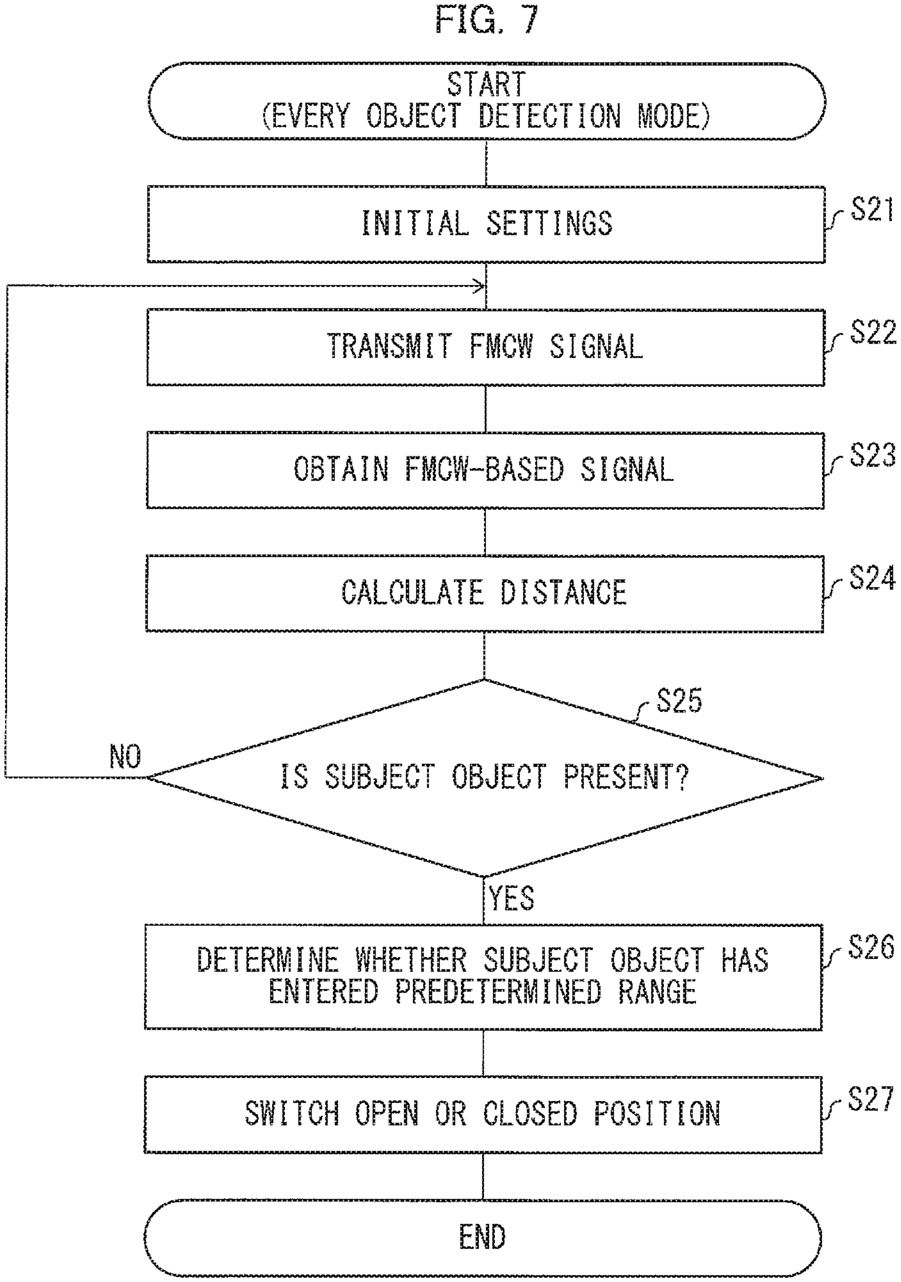
FIG. 7 is a flowchart showing example processes performed by the vehicle detection device in an every object detection mode.

Next, the following will describe processes (a control method) performed by the vehicle detection device 2, with reference to FIGS. 6 and 7. For the description with reference to FIGS. 6 and 7, only the FMCW signal is used as a signal for distance measurement. However, as a matter of course, the two-frequency CW signal can be used as an alternative to the FMCW signal.

(Processes Performed in the Vehicle Detection Mode)

First, processes performed in the vehicle detection mode will be described with reference to FIG. 6. FIG. 6 is a flowchart showing example processes performed in the vehicle detection mode.

First, the control section 28 performs initial settings of the vehicle detection device 2, such as setting of an oscillating frequency of a microwave to be transmitted (S1). Thereafter, the oscillator 25 generates a FMCW signal and a Doppler signal in a time-division manner, and the transmitting antenna 21 then transmits these signals. In the flowchart of FIG. 6, the FMCW signal is transmitted (S2), and the Doppler signal is then transmitted (S3).

Next, when the receiving antenna 22 receives a reflection wave of the FMCW signal reflected back by the subject object 100, the mixer 24 generates a FMCW signal-based beat signal. Then, the first signal obtaining section 281 obtains the beat signal thus generated (FMCW-based signal) as the first signal (S4: first signal obtaining step). The signal analyzing section 283 analyzes the first signal to calculate a distance to the subject object 100 (S5).

Meanwhile, when the receiving antenna 22 receives a reflection wave of the Doppler signal reflected back by the subject object 100, the mixer 24 generates a Doppler signal-based beat signal. Then, the second signal obtaining section 282 obtains the beat signal thus generated (Doppler-based signal) as the second signal (S6: second signal obtaining step). The signal analyzing section 283 analyzes the second signal to calculate the magnitude (signal amount) of the amplitude of the second signal (S7). In S7, the signal analyzing section 283 may analyze the second signal to calculate the velocity of the subject object 100 (or travel direction of the subject object 100).

Then, the vehicle determining section 284 compares the distance having been calculated in S5 and the signal amount having been calculated in S7 with the aforementioned established data to determine whether the subject object 100 is a vehicle or not (S8: vehicle determining step). In a case where it has been determined that the subject object 100 is a vehicle (YES in S8), the proximity detecting section 285 determines whether the vehicle has entered the predetermined range, and then transmits a result of the determination (on whether the vehicle has entered the predetermined range) to the opening and closing device 50 (S9). The opening and closing device 50 switches an open or closed position of the opening and closing bar 51 based on that determination result (S10). On the other hand, in a case where NO in S8, the procedure returns to S2.

Note that (i) the process in S2 and the process in S3 may be performed in reverse order, and (ii) the processes in S4 and S5 and the processes in S6 and S7 may be performed in reverse order. Further, in the above (ii), the processes in S4 and S5 may be performed concurrently with the processes in S6 and S7.

(Processes Performed in the Every Object Detection Mode)

Next, the following will describe processes performed in the every object detection mode with reference to FIG. 7. FIG. 7 is a flowchart showing example processes performed in the every object detection mode.

First, the control section 28 performs initial settings of the vehicle detection device 2, such as setting of an oscillating frequency of a microwave to be transmitted (S21). In S21, the control section 28 performs a setting that causes the oscillator 25 to generate only a FMCW signal. Thereafter, the processes in S2, S4, and S5 in FIG. 6 are performed (in S22 through S24).

Further, the vehicle determining section 284 determines whether the subject object 100 is present ahead of the vehicle detection device 2 (S25). In a case where it has been determined that the subject object 100 is present (YES in S25), the proximity detecting section 285, as in S9, determines whether the subject object 100 has entered the predetermined range based on the distance thus calculated in S24, and then transmits a result of the determination (on whether the subject object 100 has entered the predetermined range) to the opening and closing device 50 (S26). Then, the process in S10 in FIG. 6 is performed (S27). On the other hand, in a case where NO in S25, the procedure returns to S22.

In the flowchart of FIG. 7, the setting that causes only the FMCW signal to be transmitted is performed in S21. However, this is not intended to limit the present invention. Alternatively, in the internal processing of the control section 28, the Doppler signal-based processing may be disabled. In such a case, for example, the processes in S1 through S3 in FIG. 6 are performed, followed by the process in S23 and subsequent processes in FIG. 7. That is, although the transmitting antenna 21 transmits the FMCW signal and the Doppler signal, the control section 28 performs the processing based on only the FMCW signal.

Further, the process performed in S26 may be alternatively arranged such that the proximity detecting section 285 transmits the determination result to a presentation device (e.g. a display device, a sound output device, etc. (not shown in any of the drawings)) that can communicate with the vehicle detection device 2, and the presentation device then presents the determination result to the user.

<Main Advantageous Effect of the Vehicle Detection Device 2>

As described above, the vehicle detection device 2 uses not only the second signal (Doppler signal-based signal) but also the first signal (FMCW signal-based or two-frequency CW signal-based signal) to determine whether the subject object 100 is a vehicle or not. This makes it possible to perform the determination based on an actual size of the subject object 100, not based on an apparent size of a subject object. This allows the vehicle detection device 2 to easily distinguish between a vehicle and a subject object (e.g. a human) other than a vehicle, and thus allows the vehicle detection device 2 to detect a vehicle accurately.

Embodiment 2

Another embodiment of the present invention will be described below with reference to FIGS. 8 and 9. For convenience of explanation, components of Embodiment 2 that are identical in function to their respective corresponding members described in Embodiment 1 are each assigned a common reference numeral, and are not described here.

<Internal Configuration of Vehicle Detection Device 2*a*>

Figure 8:
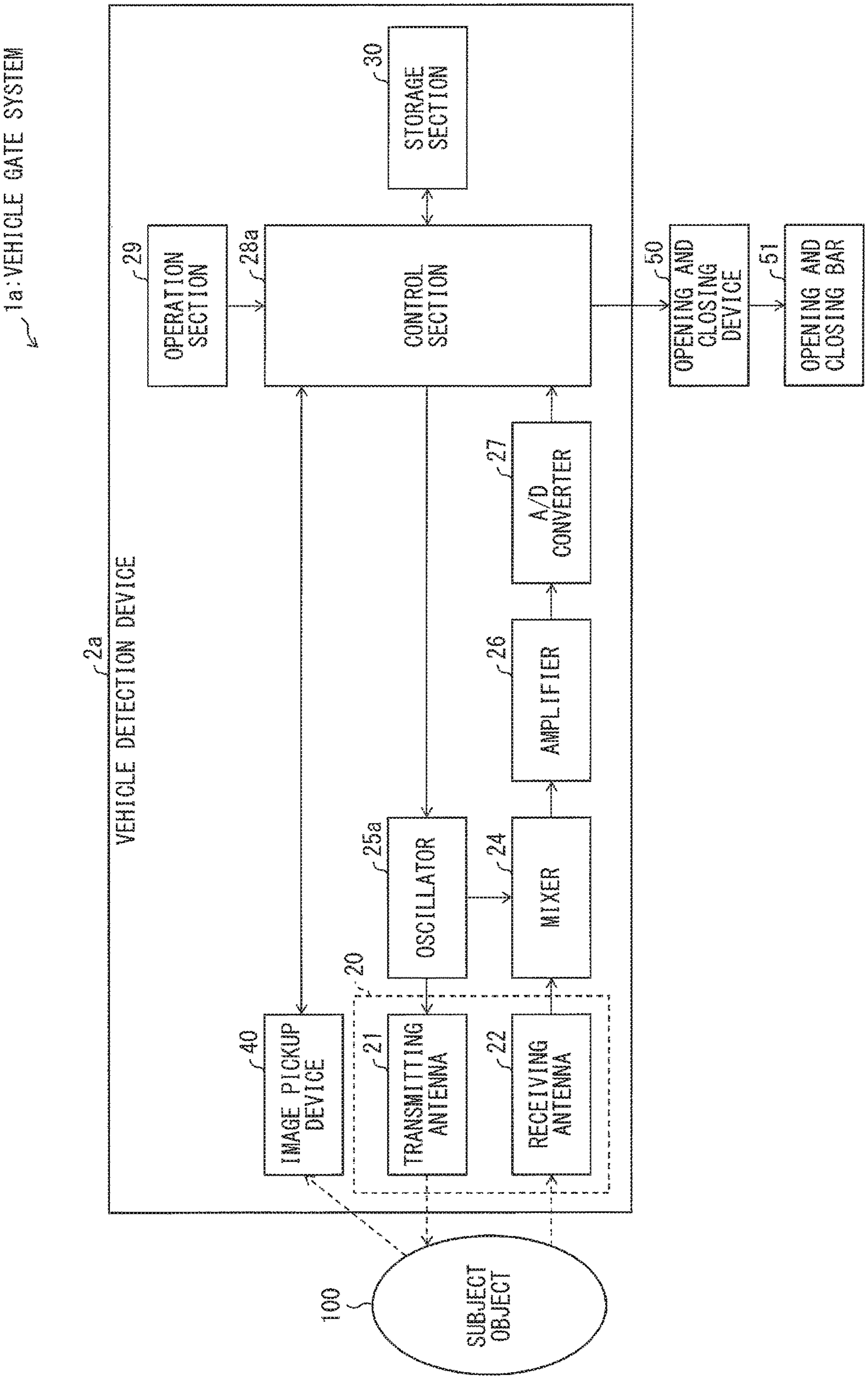
FIG. 8 is a block diagram schematically illustrating an example configuration of a vehicle gate system in accordance with Embodiment 2 of the present invention.

FIG. 8 is a block diagram schematically illustrating an example configuration of a vehicle gate system 1*a*. As illustrated in FIG. 8, the vehicle gate system 1*a* includes a vehicle detection device 2*a*, an opening and closing device 50, and an opening and closing bar 51. The vehicle detection device 2*a* in accordance with the present embodiment differs from the vehicle detection device 2 in accordance with Embodiment 1 in that the vehicle detection device 2*a* includes an image pickup device 40, and the magnitude of the solid angle formed by the subject object 100 is determined based on an image captured by the image pickup device 40, instead of using the Doppler signal.

The image pickup device 40 is a device which obtains an image of the subject object 100. Examples of the image pickup device 40 include a charge coupled device (CCD) image sensor, a complementary metal oxide semiconductor (CMOS) image sensor, an infrared image sensor, and the like. Image data indicating an image of the subject object 100 is transmitted to a second signal obtaining section 282*a* of a control section 28*a*.

The oscillator 25*a*, in response to an instruction from the control section 28*a*, generates a FMCW signal or a two-frequency CW signal and then transmits the FMCW signal or the two-frequency CW signal to a transmitting antenna 21. The transmitting antenna 21 transmits the FMCW signal or the two-frequency CW signal in the form of a microwave. That is, in the present embodiment, various processes on a Doppler signal are not performed, and the image pickup device 40 is provided instead.

Figure 9:
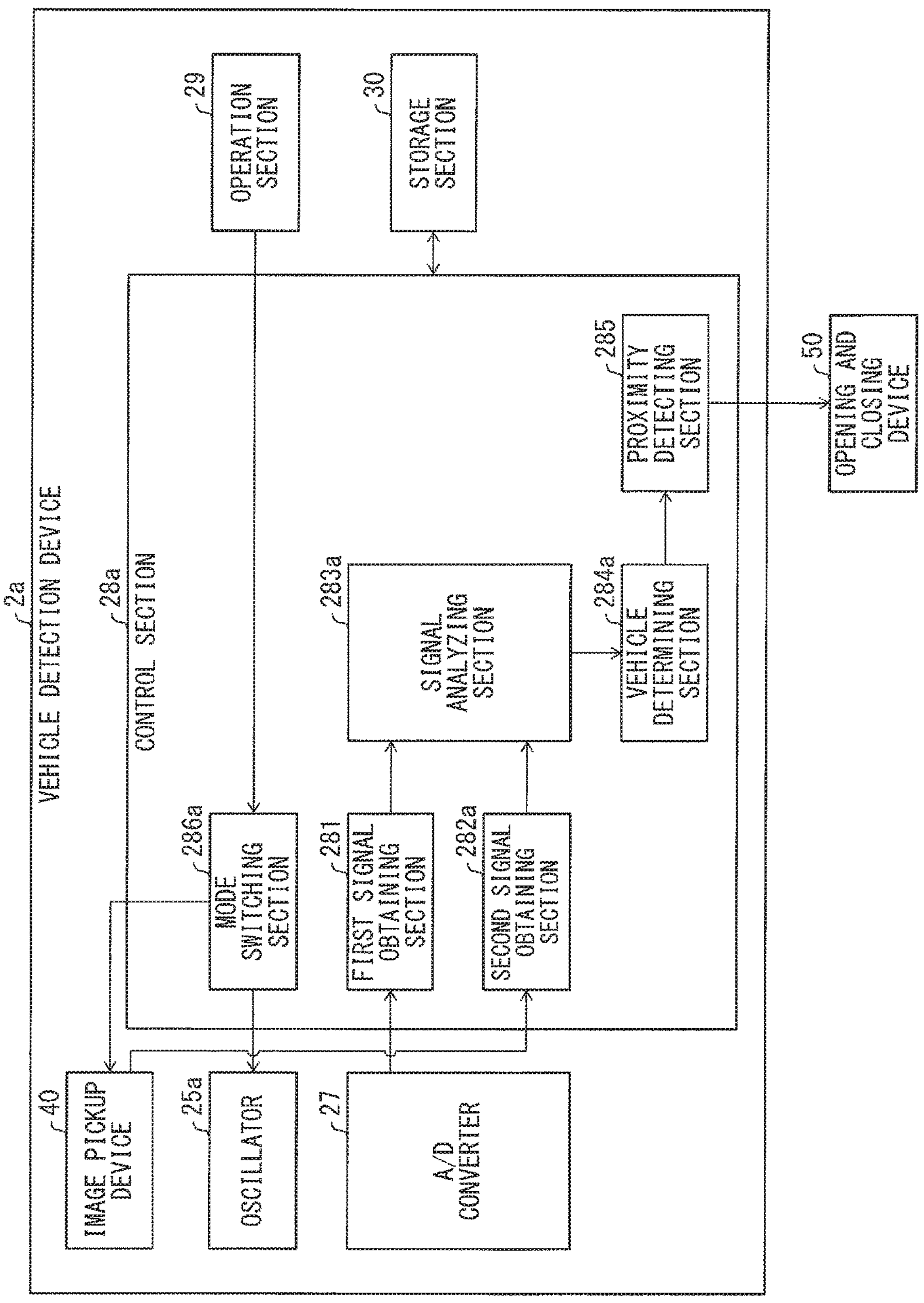
FIG. 9 is a block diagram schematically illustrating an example configuration of the vehicle detection device included in the vehicle gate system.

FIG. 9 is a block diagram schematically illustrating an example configuration of the vehicle detection device 2*a*. As illustrated in FIG. 9, the control section 28*a* mainly include a first signal obtaining section 281, the second signal obtaining section 282*a*, a signal analyzing section 283*a*, a vehicle determining section 284*a*, a proximity detecting section 285, and a mode switching section 286*a*. The vehicle detection device 2*a* performs processing on the FMCW signal or the two-frequency CW signal in the same manner as the vehicle detection device 2.

The second signal obtaining section 282*a* obtains, from the image pickup device 40, image data that serves as a second signal corresponding to a solid angle formed by the subject object 100. Then, the second signal obtaining section 282*a* transmits the obtained image data to the signal analyzing section 283*a*.

The signal analyzing section 283*a* performs various kinds of image processing processes on the image data indicated by the second signal to extract a figure of the subject object 100 contained in the image data and to calculate, for example, an area of the figure as information indicative of a size of the figure. By calculating the size of the figure of the subject object 100, it is possible to determine the magnitude of the solid angle, i.e. the apparent size of the subject object 100. The signal analyzing section 283*a* transmits area data indicating an area of the figure to the vehicle determining section 284*a*.

The vehicle determining section 284*a* compares the received distance data and area data with second established data stored in the storage section 30 to determine whether the subject object 100 is a vehicle or not.

Like the established data in Embodiment 1, the second established data is a threshold value for determining whether the subject object 100 is a vehicle or not. The second established data indicates, for example, a value of the size of a figure contained in the image data which value varies with varying distance from the vehicle detection device 2*a*. The second established data may contain graphs showing respective sizes of vehicle and human figures or may contain a graph showing a size of only one of a vehicle figure and a human figure. The vehicle determining section 284*a* performs the above determination in the same manner as the vehicle determining section 284 in Embodiment 1.

In a case where the mode switching section 286*a* has performed switching to the vehicle detection mode, the mode switching section 286*a* instructs the oscillator 25*a* to generate a FMCW signal or a two-frequency CW signal and instructs the image pickup device 40 to capture an image of the subject object 100. On the other hand, in a case where the mode switching section 286*a* has performed switching to the every object detection mode, the mode switching section 286*a* instructs the image pickup device 40 to stop capturing an image of the subject object 100 or transmitting image data to the second signal obtaining section 282*a*.

In an alternative arrangement, in like manner with the mode switching section 286, in a case where switching to the every object detection mode has been performed, instead of stopping an image capture of the image pickup device 40, disabling processing on the second signal may be done by disabling any one of the function performed by the second signal obtaining section 282*a*, the area calculation function performed by the signal analyzing section 283*a*, and the function performed by the vehicle determining section 284*a*.

In the arrangement described above, the vehicle detection device 2*a* transmits no Doppler signal and does not perform the processing on the second signal. However, as in the arrangement in Embodiment 1, the vehicle detection device 2*a* may transmit a Doppler signal and perform the processing on the second signal. With such an arrangement, it is possible to calculate the velocity of the subject object 100 or the travel direction of the subject object 100.

<Processes Performed by the Vehicle Detection Device 2*a*>

Next, the following will describe processes performed by the vehicle detection device 2*a*. In the vehicle detection mode, transmission of a Doppler signal in S3 of FIG. 6 is replaced by capture of an image of the subject object 100 by the image pickup device 40. Unlike Embodiment 1, the order in which the process in S2 (transmission of a FMCW signal) and the process in S3 are performed does not matter in the present embodiment. The process in S2 and the process in S3 may be performed concurrently with each other.

In S6 of FIG. 6, the second signal obtaining section 282*a* obtains image data as the second signal, instead of obtaining the Doppler signal-based beat signal. In S7, the signal analyzing section 283*a* performs processing on the image data to calculate the size of a figure of the subject object 100 instead of calculating a signal amount. In S8, the vehicle determining section 284*a* compares the distance data and image data calculated by the signal analyzing section 283*a* with the second established data to determine whether the subject object 100 is a vehicle or not.

The other processes are the same as those illustrated in FIG. 6. Further, the processes performed in the every object detection mode are the same as those illustrated in FIG. 7.

<Main Advantageous Effect of the Vehicle Detection Device 2*a*>

As described above, by using the image data, instead of transmitting and receiving a Doppler signal, it is possible to detect a vehicle accurately as in Embodiment 1.

Embodiment 3

Still another embodiment of the present invention will be described below with reference to FIGS. 10 and 11. For convenience of explanation, components of Embodiment 3 that are identical in function to their respective corresponding components described in Embodiments 1 and 2 are each assigned a common reference numeral, and are not described here.

<Internal Configuration of Vehicle Detection Device 2*b*>

Figure 10:
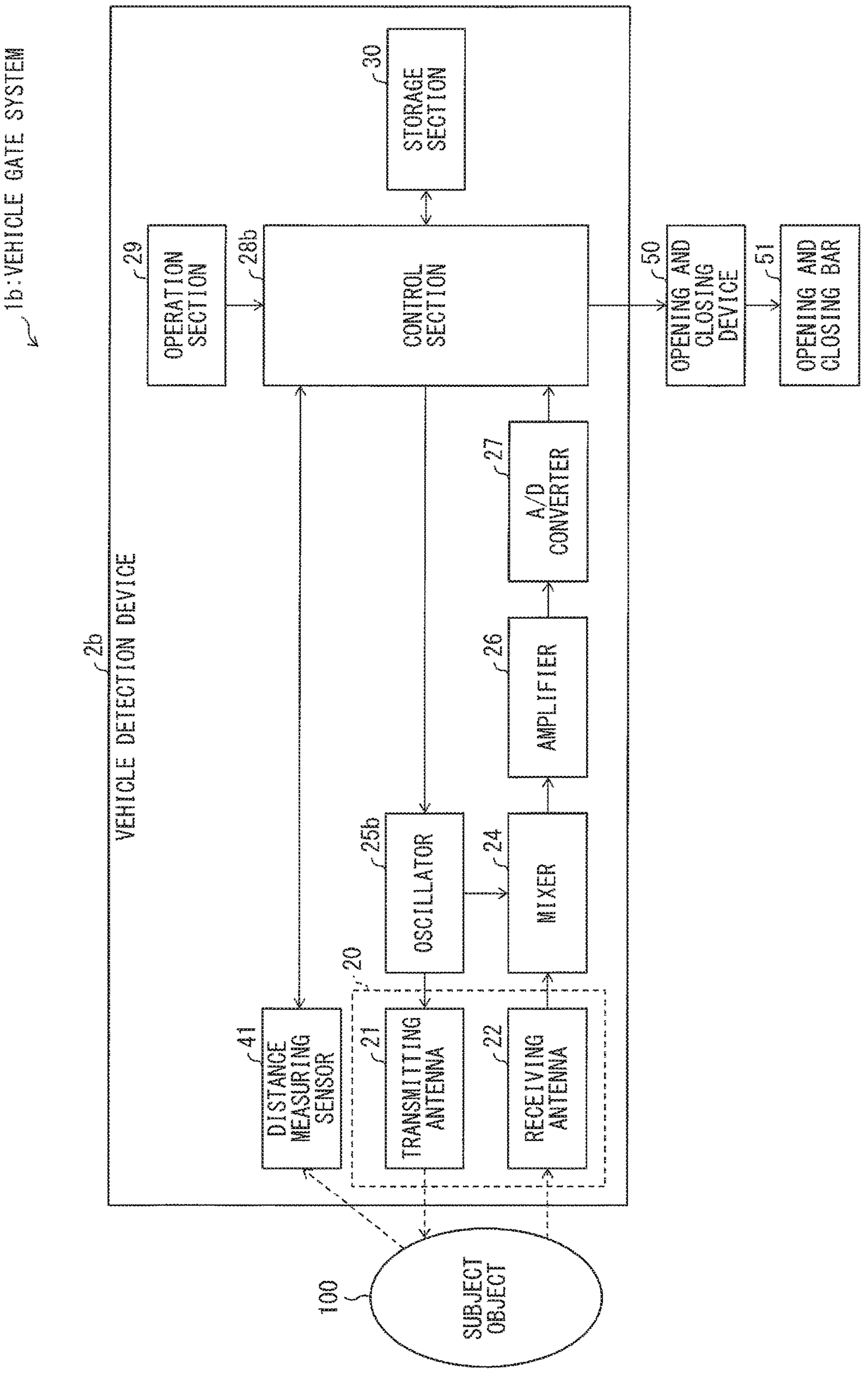
FIG. 10 is a block diagram schematically illustrating an example configuration of a vehicle gate system in accordance with Embodiment 3 of the present invention.

FIG. 10 is a block diagram schematically illustrating an example configuration of a vehicle gate system 1*b*. As illustrated in FIG. 10, the vehicle gate system 1*b* includes a vehicle detection device 2*b*, an opening and closing device 50, and an opening and closing bar 51. The vehicle detection device 2*b* in the present embodiment differs from the vehicle detection device 2 in Embodiment 1 and the vehicle detection device 2*a* in Embodiment 2 in that the vehicle detection device 2*b* includes a distance measuring sensor 41 to measure a distance to the subject object 100, instead of using a FMCW signal or a two-frequency CW signal.

The distance measuring sensor 41 mainly includes: a light source which emits laser light to the subject object 100; and a photoreceptor which receives laser light reflected back by the subject object 100. For example, in a case where a position sensing device (PSC) or a CMOS is used as the photoreceptor, a distance to the subject object 100 is calculated based on a position at which an image is formed on the photoreceptor. In such an arrangement, position data indicating the position at which an image is formed is transmitted as the first signal to a first signal obtaining section 281*b* of a control section 28*b*. Alternatively, the distance to the subject object 100 may be calculated based on a time difference between emission of laser light and reception of laser light. In such an arrangement, differential data indicating a time difference between emission of laser light and reception of laser light or a phase difference between emitted laser light and received laser light, is transmitted as the first signal to the first signal obtaining section 281*b* of the control section 28*b*.

The distance measuring sensor 41 may be replaced by any other sensor that can measure a distance to the subject object 100. The distance measuring sensor 41 may be, for example, an ultrasonic sensor. Further, the distance measuring sensor 41 may have a function performed by the first signal obtaining section 281*b* (described later) and a distance calculation function performed by a signal analyzing section 283*b*.

The oscillator 25*b*, in response to an instruction from the control section 28*b*, generates a Doppler signal and then transmits the Doppler signal to a transmitting antenna 21. The transmitting antenna 21 transmits the Doppler signal in the form of a microwave. That is, in the present embodiment, various processes on a FMCW signal or a two-frequency CW signal are not performed, and the distance measuring sensor 41 is provided instead.

Figure 11:
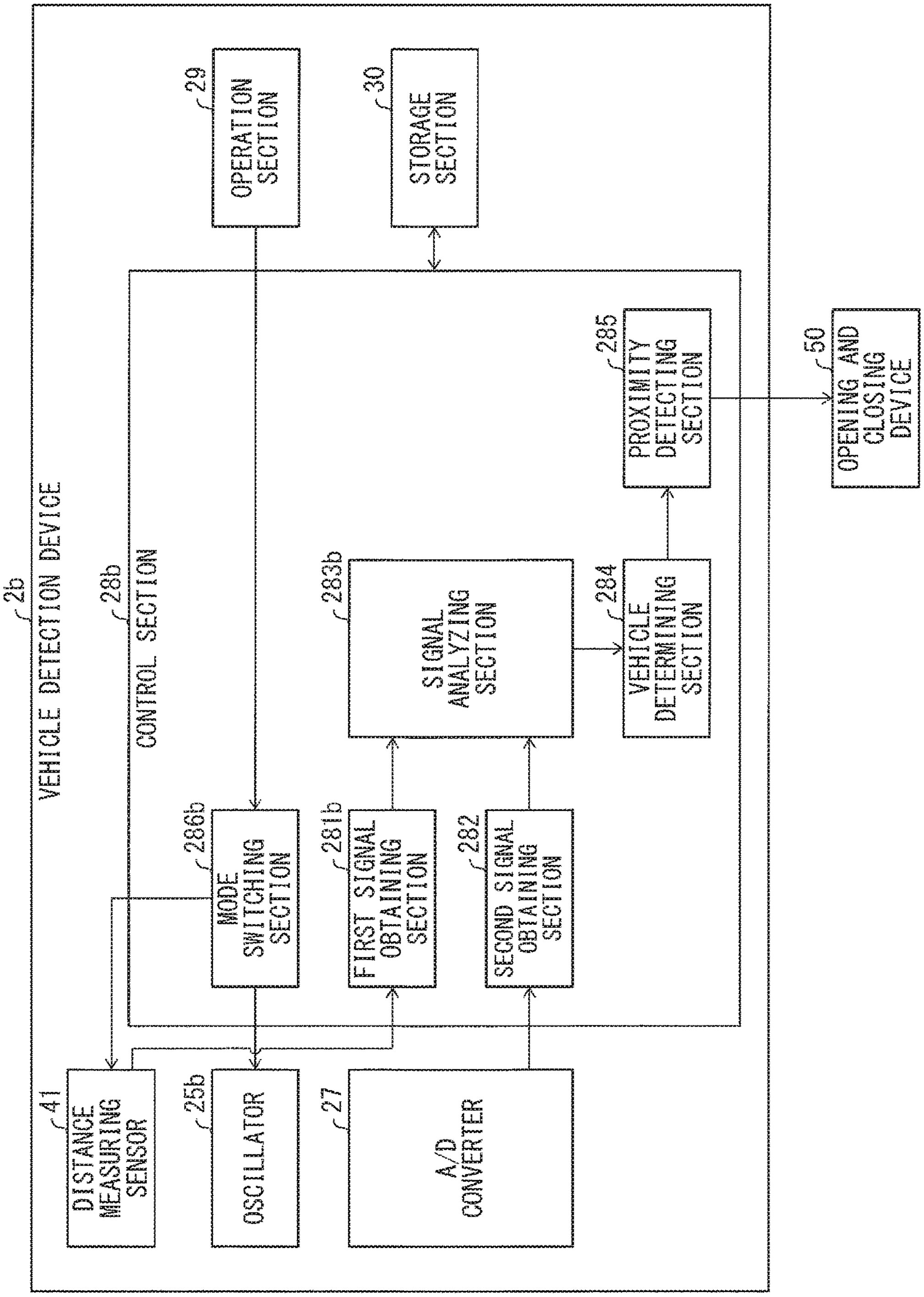
FIG. 11 is a block diagram schematically illustrating an example configuration of the vehicle detection device included in the vehicle gate system.

FIG. 11 is a block diagram schematically illustrating an example configuration of the vehicle detection device 2*b*. As illustrated in FIG. 11, the control section 28*b* mainly includes the first signal obtaining section 281*b*, a second signal obtaining section 282, the signal analyzing section 283*b*, a vehicle determining section 284, a proximity detecting section 285, and a mode switching section 286*b*. The vehicle detection device 2*b* performs processing on the Doppler signal in the same manner as the vehicle detection device 2.

The first signal obtaining section 281*b* obtains the position data or the differential data as the first signal corresponding to a distance to the subject object 100. Then, the first signal obtaining section 281*b* transmits the position data or differential data thus obtained to the signal analyzing section 283*b*.

The signal analyzing section 283*b* analyzes the position data or the differential data to calculate a distance to the subject object 100, and then transmits distance data to the vehicle determining section 284.

In a case where the mode switching section 286*b* has performed switching to the vehicle detection mode, the mode switching section 286*b* instructs the oscillator 25*b* to generate a Doppler signal and instructs the distance measuring sensor 41 to emit laser light. On the other hand, in a case where the mode switching section 286*b* has performed switching to the every object detection mode, the mode switching section 286*b* instructs the distance measuring sensor 41 to stop emitting laser light or transmitting the position data or the differential data to the first signal obtaining section 281*b*.

In an alternative arrangement, in like manner with the mode switching section 286, in a case where switching to the every object detection mode has been performed, instead of stopping the function performed by the distance measuring sensor 41, disabling processing on the first signal may be done by disabling any one of the function performed by the first signal obtaining section 281*b*, the distance calculation function performed by the signal analyzing section 283*b*, and the function performed by the vehicle determining section 284.

<Processes Performed by the Vehicle Detection Device 2*b*>

Next, the following will describe processes performed by the vehicle detection device 2*b*. In the vehicle detection mode, transmission of a FMCW signal in S2 of FIG. 6 is replaced by transmission of laser light by the distance measuring sensor 41. Unlike Embodiment 1, the order in which the process in S2 and the process in S3 (transmission of a Doppler signal) are performed does not matter in the present embodiment. The process in S2 and the process in S3 may be performed concurrently with each other.

In S4 of FIG. 6, the first signal obtaining section 281*b* obtains the position data or the differential data as the first signal, instead of obtaining a FMCW signal-based beat signal. In S5, the signal analyzing section 283*b* calculates a distance to the subject object 100 based on the position data or the differential data. The other processes are the same as those illustrated in FIG. 6.

Further, in the every object detection mode, the processes in S2, S4, and S5 are performed in S22 through S24 of FIG. 7, respectively. The other processes are the same as those illustrated in FIG. 7.

<Main Advantageous Effect of the Vehicle Detection Device 2*b*>

As described above, by using the distance measuring sensor 41, instead of transmitting and receiving a FMCW signal or a two-frequency CW signal, it is possible to detect a vehicle accurately as in Embodiment 1.

<Modifications>

A vehicle detection device in accordance with the present invention may be configured to include the image pickup device 40 described in Embodiment 2 and the distance measuring sensor 41 described in Embodiment 3, instead of being configured to transmit and receive the aforementioned two types of signals. That is, a vehicle detection device in accordance with the present invention can also be realized with a configuration such that no microwave is transmitted and received. In the above arrangement, in a case where the velocity of the subject object 100 or the travel direction of the subject object 100 is calculated based on a Doppler signal, a vehicle detection device in accordance with the present invention may be configured to transmit and receive Doppler signals.

Embodiment 4

Figure 12:
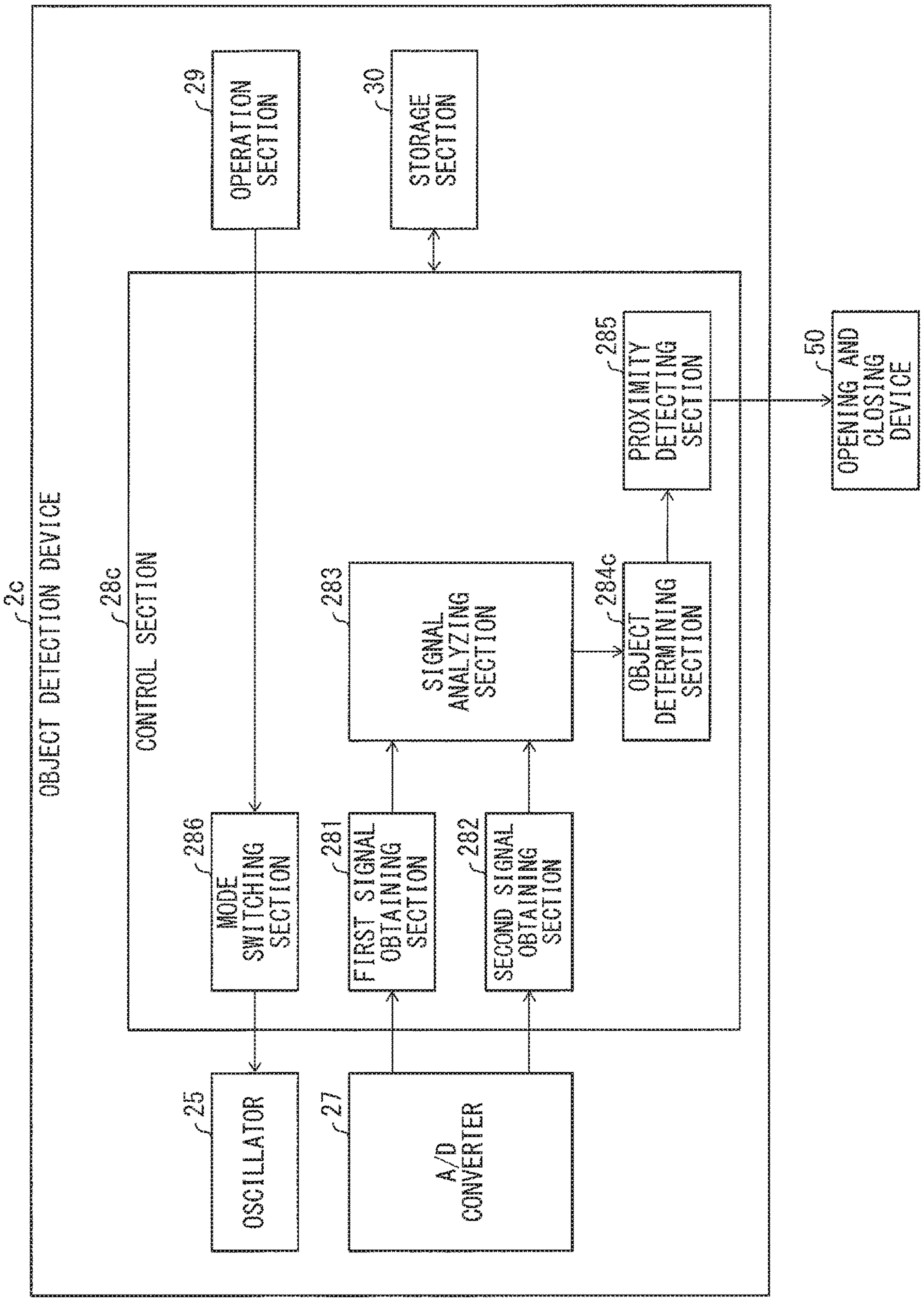
FIG. 12 is a block diagram schematically illustrating an example configuration of a vehicle gate system in accordance with Embodiment 4 of the present invention.

Yet another embodiment of the present invention will be described below with reference to FIG. 12. For convenience of explanation, components of Embodiment 4 that are identical in function to their respective corresponding components described in Embodiments 1, 2, and 3 are each assigned a common reference numeral, and are not described here.

In the present embodiment, an object detection device 2*c* which detects a predetermined object will be described. In a case where the predetermined object is a vehicle, the configuration of the object detection device 2*c* is the same as that of the vehicle detection device 2 in Embodiment 1. The predetermined object is an object to be detected by the object detection device 2*c* in a situation where a plurality of objects need to be distinguished from each other. For example, in a situation where a human and a pet need to be distinguished from each other, the predetermined object is either a human or a pet. The plurality of objects are not limited to different kinds of objects. The plurality of objects may be the same kind of objects, such as an adult and a child.

The object detection device 2*c* is configured in the same manner as the vehicle detection device 2 except that a control section 28*c* includes an object determining section 284*c*, instead of the vehicle determining section 284.

The object determining section 284*c* determines, based on the first and second signals, that the subject object 100 is the predetermined object in a case where an actual size of the subject object 100 is equal to or greater than a predetermined size. The determination is made with reference to third established data stored in a storage section 30.

The third established data is threshold values for determining whether the subject object 100 is the predetermined object or not, and indicates a value of the magnitude (signal amount) of the amplitude of the second signal which value varies with varying distance from the object detection device 2*c*. As in Embodiment 1, for example, a graph showing signal amounts obtained by transmitting Doppler signals to the predetermined object and/or a graph showing signal amounts obtained by transmitting Doppler signals to an object to be distinguished from the predetermined object are/is stored as the third established data.

The flow of the processes performed by the object detection device 2*c* is similar to that of the processes performed by the vehicle detection device 2 as illustrated in FIGS. 6 and 7, except that it is determined whether the subject object 100 is the predetermined object or not in S8 of FIG. 6.

<Main Advantageous Effect of the Object Detection Device 2*c*>

As described above, the object detection device 2*c* can detect the predetermined object accurately in the same manner as the vehicle detection device 2.

<Modifications>

The object detection device 2*c* may include, as in the vehicle detection devices 2*a* and 2*b*, the image pickup device 40 described in Embodiment 2 and/or the distance measuring sensor 41 described in Embodiment 3, instead of being configured to transmit and receive the aforementioned two types of signals.

[Software Implementation Examples]

Control blocks of the vehicle detection device 2 (particularly, the first signal obtaining section 281, the second signal obtaining section 282, the signal analyzing section 283, the vehicle determining section 284, the proximity detecting section 285, and the mode switching section 286 provided in the control section 28) can be realized by a logic circuit (hardware) provided in an integrated circuit (IC chip) or the like or can be alternatively realized by software as executed by a central processing unit (CPU).

In the latter case, the vehicle detection device 2 includes a CPU that executes instructions of a program that is software realizing the foregoing functions; read-only memory (ROM) or a storage device (each referred to as "storage medium") in which the program and various kinds of data are stored so as to be readable by a computer (or a CPU); and random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to or made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

Examples of the program include a vehicle detection program for causing a computer to function as the first signal obtaining section 281, the second signal obtaining section 282, and the vehicle determining section 284.

This also applies to (i) control blocks of the vehicle detection device 2*a* (particularly, the first signal obtaining section 281, the second signal obtaining section 282*a*, the signal analyzing section 283*a*, the vehicle determining section 284*a*, the proximity detecting section 285, and the mode switching section 286 provided in the control section 28*a*), (ii) control blocks of the vehicle detection device 2*b* (particularly, the first signal obtaining section 281*b*, the second signal obtaining section 282, the signal analyzing section 283*b*, the vehicle determining section 284, the proximity detecting section 285, and the mode switching section 286*b* provided in the control section 28*b*), and (iii) control blocks of the object detection device 2*c* (particularly, the first signal obtaining section 281, the second signal obtaining section 282, the signal analyzing section 283, the object determining section 284*c*, the proximity detecting section 285, and the mode switching section 286 provided in the control section 28*c*).

[Additional Remarks]

It is a main object of the present invention to provide a vehicle detection device and the like, in an arrangement such that detection of a vehicle is performed without using a coil, being capable of detecting a vehicle while positively distinguishing the vehicle from a subject object other than a vehicle. Further, it is another object of the present invention to provide an object detection device, in an arrangement such that detection of a predetermined object is performed without using a coil, being capable of detecting a predetermined object while positively distinguishing the predetermined object from an object other than a predetermined object.

(1) A vehicle detection device in accordance with Aspect 1 of the present invention is a vehicle detection device which detects a vehicle, including: a first signal obtaining section which obtains a first signal corresponding to a distance to a subject object; a second signal obtaining section which obtains a second signal corresponding to a solid angle formed by the subject object; and a vehicle determining section which determines, based on the first and second signals, that the subject object is a vehicle, in a case where an actual size of the subject object is equal to or greater than a predetermined size.

According to the above configuration, a vehicle detection device in accordance with an aspect of the present invention determines that a subject object is a vehicle, based on a distance to the subject object and a solid angle formed by the subject object, in a case where an actual size of the subject object is equal to or greater than a predetermined size. Thus, the vehicle detection device is capable of determining, using a solid angle at a position where a subject object is present, whether the subject object is a vehicle or not as long as the subject object is present anywhere in the detection range. That is, the vehicle detection device is capable of performing the determination based on an actual size of a subject object.

Consequently, a vehicle detection device in accordance with an aspect of the present invention, in an arrangement such that detection of a vehicle is performed without using a coil, is capable of detecting a vehicle while positively distinguishing the vehicle from a subject object other than a vehicle. That is, it is possible to prevent incorrect detection of a subject object (e.g. a human) other than a vehicle due to an entry of that subject object into a detection range where a subject object is detected.

(2) A vehicle detection device in accordance with Aspect 2 of the present invention is preferably arranged, in the vehicle detection device described in (1) above, to further include: an oscillator which generates (i) a frequency modulated continuous wave (FMCW) signal or a two-frequency continuous wave (CW) signal and (ii) a Doppler signal while switching between (i) the FMCW signal or the two-frequency CW signal and (ii) the Doppler signal in a time-division manner; a transmitting antenna which transmits (i) the FMCW signal or the two-frequency CW signal and (ii) the Doppler signal, which have been generated by the oscillator, in a form of microwaves; a receiving antenna which receives microwaves which originate from the microwaves having been transmitted from the transmitting antenna and reflected back by the subject object; and a signal processing section which processes, out of the microwaves having been received by the receiving antenna, a FMCW signal-based or two-frequency CW signal-based microwave into the first signal, and processes a Doppler signal-based microwave into the second signal.

According to the above configuration, the transmitting antenna transmits the FMCW signal or the two-frequency CW signal and the Doppler signal, which have been generated by the oscillator, in a form of microwaves. Thus, in a case where a subject object is present, two types of signals (two types of reflection waves) reflected by the subject object can be received via the receiving antenna.

Further, the signal processing section processes the two types of signals into the first signal and the second signal, respectively. This allows the vehicle determining section to determine whether a subject object is a vehicle based on the first signal and the second signal.

Further, since the oscillator generates the two types of signals in a time-division manner, there is no need to prepare individual transmitting antennas, dedicated to the respective signals, for transmitting the respective two types of signals. Similarly, there is no need to prepare individual receiving antennas, dedicated to reflection waves, for receiving the respective two types of reflection waves. Thus, an antenna which transmits and receives two types of signals can be constituted by a single transmitting antenna and a single receiving antenna. That is, an antenna which transmits and receives two types of signals can be realized by a single unit.

(3) A vehicle detection device in accordance with Aspect 3 of the present invention is preferably arranged, in the vehicle detection device described in (1) or (2) above, to further include: a proximity detecting section which detects, based on the first signal and a result of the determination made by the vehicle determining section, that a vehicle has entered a predetermined range.

According the above configuration, in a case where it has been determined that a subject object is a vehicle, it is possible to determine whether the vehicle has entered the predetermined range.

(4) A vehicle detection device in accordance with Aspect 4 of the present invention is preferably arranged, in the vehicle detection device described in (3) above, to further include: a switching section which performs switching of the proximity detecting section so that the proximity detecting section detects that the subject object has entered the predetermined range, regardless of whether the subject object is a vehicle or not.

According the above configuration, thanks to the switching section, it is possible for the proximity detecting section to detect that that a subject object has entered the predetermined range, regardless of whether the subject object is a vehicle or not. That is, it is possible to determine whether a subject object has entered the predetermined range, regardless of whether the subject object is a vehicle or not.

A vehicle gate system in accordance with Aspect 5 of the present invention is preferably arranged to include: the vehicle detection device described in (3) or (4) above; and an opening and closing device which performs switching, based on a result of detection made by the vehicle detection device, between a state to let a vehicle stop and a state to let a vehicle pass.

According to the above configuration, the opening and closing device switches between the above two states based on a result of the determination on whether a vehicle or a subject object other than a vehicle has entered the predetermined range. This allows the opening and closing device to switch between the above two states at an appropriate timing.

(6) An object detection device in accordance with Aspect 6 of the present invention is an object detection device which detects a predetermined object, including: a first signal obtaining section which obtains a first signal corresponding to a distance to a subject object; a second signal obtaining section which obtains a second signal corresponding to a solid angle formed by the subject object; and an object determining section which determines, based on the first and second signals, that the subject object is the predetermined object, in a case where an actual size of the subject object is equal to or greater than a predetermined size.

According to the above configuration, an object detection device in accordance with an aspect of the present invention determines that a subject object is a predetermined object, based on a distance to the subject object and a solid angle formed by the subject object, in a case where an actual size of the subject object is equal to or greater than a predetermined size. Thus, the object detection device is capable of determining, using a solid angle at a position where a subject object is present, whether the subject object is a predetermined object or not as long as the subject object is present anywhere in the detection range. That is, the object detection device is capable of performing the determination based on an actual size of a subject object.

Consequently, an object detection device in accordance with an aspect of the present invention, in an arrangement such that detection of a predetermined object is performed without using a coil, is capable of detecting a predetermined object while positively distinguishing the predetermined object from a subject object other than a predetermined object. That is, it is possible to prevent incorrect detection of a subject object other than a predetermined object due to an entry of that subject object into a detection range where a subject object is detected.

(7) A method of controlling a vehicle detection device in accordance with Aspect 7 of the present invention is a method of controlling a vehicle detection device which detects a vehicle, including: a first signal obtaining step of obtaining a first signal corresponding to a distance to a subject object; a second signal obtaining step of obtaining a second signal corresponding to a solid angle formed by the subject object; and a vehicle determining step of determining, based on the first and second signals, that the subject object is a vehicle, in a case where an actual size of the subject object is equal to or greater than a predetermined size.

The above method, similarly to the vehicle detection device described in (1) above, allows detecting a vehicle while positively distinguishing the vehicle from a subject object other than a vehicle.

Further, a vehicle detection device in accordance with an aspect of the present invention may be realized by a computer. In this case, the present invention encompasses: a vehicle detection program which causes a computer to operate as the first signal obtaining section, the second signal obtaining section, and the vehicle determining section included in the vehicle detection device so that the vehicle detection device can be realized by the computer; and a computer-readable storage medium storing the vehicle detection program.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a vehicle detection sensor capable of communicating with an opening and closing device and a vehicle counting device which are installed in a parking lot and the like place, wherein the opening and closing device controls opening and closing of an opening and closing bar, and the vehicle counting device counts vehicles.

REFERENCE SIGNS LIST

1, 1*a*, 1*b* Vehicle gate system
2, 2*a*, 2*b* Vehicle detection device
2*c* Object detection device
21 Transmitting antenna
22 Receiving antenna
24 Mixer (signal processing section)
25, 25*a*, 25*b* Oscillator
50 Opening and closing device
100, 100*a*, 100*b* Subject object
281, 281*b* First signal obtaining section
282, 282*a* Second signal obtaining section
284, 284*a* Vehicle determining section
284*c* Object determining section
285 Proximity detecting section
286, 286*a*, 286*b* Mode switching section (switching section)

The invention claimed is:

1. A vehicle detection device which detects a vehicle, comprising:

a first signal obtaining section which obtains a first type of radar signal corresponding to a distance to a subject object;

a second signal obtaining section which obtains a second type of radar signal corresponding to a solid angle formed by the subject object;

a vehicle determining section which determines, based on the first and second signals, that the subject object is a vehicle, in a case where an actual size of the subject object is equal to or greater than a predetermined size;

an oscillator which generates (i) a frequency modulated continuous wave (FMCW) signal or a two-frequency continuous wave (CW) signal and (ii) a Doppler signal while switching between (i) the FMCW signal or the two-frequency CW signal and (ii) the Doppler signal in a time-division manner;

a transmitting antenna which transmits (i) the FMCW signal or the two-frequency CW signal and (ii) the Doppler signal, which have been generated by the oscillator, in a form of microwaves;

a receiving antenna which receives microwaves which originate from the microwaves having been transmitted from the transmitting antenna and reflected back by the subject object; and a signal processing section which processes, out of the microwaves having been received by the receiving antenna, a FMCW signal-based or two-frequency CW signal-based microwave into the first signal, and processes a Doppler signal-based microwave into the second signal.

2. The vehicle detection device according to claim 1, further comprising:

a proximity detecting section which detects, based on the first signal and a result of the determination made by the vehicle determining section, that a vehicle has entered a predetermined range.

3. The vehicle detection device according to claim 2, further comprising:

a switching section which performs switching of the proximity detecting section so that the proximity detecting section detects that the subject object has entered the predetermined range, regardless of whether the subject object is a vehicle or not.

4. The vehicle detection device according to claim 1, further comprising a proximity detecting section configured to transmit that the subject object is a vehicle to an opening and closing device which performs switching between a state to let the vehicle stop and a state to let the vehicle pass.

5. The vehicle detection device according to claim 1, further comprising a support attaching section configured to mount the vehicle detection device to a fixed structure.

6. A method of controlling a vehicle detection device which detects a vehicle, the method comprising:

a first signal obtaining step of obtaining a first type of radar signal corresponding to a distance to a subject object;

a second signal obtaining step of obtaining a second type of radar signal corresponding to a solid angle formed by the subject object;

a vehicle determining step of determining, based on the first and second signals, that the subject object is a vehicle, in a case where an actual size of the subject object is equal to or greater than a predetermined size;

generating (i) a frequency modulated continuous wave (FMCW) signal or a two-frequency continuous wave (CW) signal and (ii) a Doppler signal while switching between (i) the FMCW signal or the two-frequency CW signal and (ii) the Doppler signal in a time-division manner;

transmitting (i) the FMCW signal or the two-frequency CW signal and (ii) the Doppler signal, which have been generated, in a form of microwaves;

receiving microwaves which originate from the transmitted microwaves and reflected back by the subject object; and processing, out of the received microwaves, a FMCW signal-based or two-frequency CW signal-based microwave into the first signal, and a Doppler signal-based microwave into the second signal.

* * * * *